United States Patent
Mark et al.

(10) Patent No.: US 6,549,861 B1
(45) Date of Patent: Apr. 15, 2003

(54) AUTOMATED SYSTEM AND METHOD FOR SPECTROSCOPIC ANALYSIS

(75) Inventors: Howard Mark, Suffern, NY (US); Emil Ciurczak, Goldens Bridg, NY (US); Gary Ritchie, Kent, CT (US)

(73) Assignee: Euro-Celtique, S.A., Luxembourg (LU)

( * ) Notice: Subject to any disclaimer, the term of this patent is extended or adjusted under 35 U.S.C. 154(b) by 212 days.

(21) Appl. No.: 09/636,041

(22) Filed: Aug. 10, 2000

(51) Int. Cl.[7] .............................................. G01R 23/16

(52) U.S. Cl. .................... 702/76; 702/76; 702/179; 702/190; 702/22; 73/659; 73/570; 73/15; 706/55; 706/22; 356/939; 356/931

(58) Field of Search .............................. 702/19, 22, 23, 702/27–28, 32–33, 75–77, 127, 179, 181, 183, 189, 193, 190–171, 197; 356/947, 939, 931, 928, 925; 250/227.14, 227.11, 216, 200, 227.18, 390.01; 382/156, 157–160; 73/659, 658, 649, 570, 53.01, 152.25; 706/15–17, 19, 22, 55; 395/63, 21; 708/813, 804, 802, 822; 703/11–12, 5, 2

(56) References Cited

U.S. PATENT DOCUMENTS

| | | | |
|---|---|---|---|
| 4,766,551 A | 8/1988 | Begley | 364/498 |
| 4,901,728 A | 2/1990 | Hutchison | 128/633 |
| 4,975,581 A | 12/1990 | Robinson et al. | 250/339 |
| 5,009,230 A | 4/1991 | Hutchison | 128/633 |
| 5,023,804 A | 6/1991 | Hoult et al. | 364/498 |
| 5,028,787 A | 7/1991 | Rosenthal et al. | 250/341 |
| 5,068,536 A | 11/1991 | Rosenthal | 250/341 |
| 5,070,874 A | 12/1991 | Barnes et al. | 128/633 |
| 5,077,475 A | 12/1991 | Rosenthal | 250/341 |
| 5,086,229 A | 2/1992 | Rosenthal et al. | 250/341 |

(List continued on next page.)

FOREIGN PATENT DOCUMENTS

| | | | |
|---|---|---|---|
| EP | 0160768 | 11/1985 | A61B/5/00 |
| EP | 0236023 | 9/1987 | G01N/33/66 |
| EP | 0382908 | 8/1990 | G01J/3/36 |

(List continued on next page.)

OTHER PUBLICATIONS

Draper, N. and Smith, H., *Applied Regression Analysis*, (3d Ed., Wiley–Interscience), p. 120 (1998).

(List continued on next page.)

*Primary Examiner*—Marc S. Hoff
*Assistant Examiner*—Elias Desta
(74) *Attorney, Agent, or Firm*—Davidson, Davidson & Kappel, LLC

(57) ABSTRACT

An automated method for modeling spectral data is provided, wherein the spectral data generated by one of diffuse reflectance, clear transmission, or diffuse transmission. The method includes accessing a set of spectral data, the set of spectral data including, corresponding spectral data for each of a plurality of samples, the spectral data for each of the plurality of samples having associated therewith at least one constituent value, the at least one constituent value being a reference value for a target substance in the sample which is measured by a independent measurement technique. A plurality of data transforms are applied to the set of spectral data to generate, for each sample, a set of transformed and untransformed spectral data. The set of transformed and untransformed spectral data, with its associated constituent values, is divided into a calibration sub-set and a validation sub-set, and one or more of a partial least squares, a principal component regression, a neural net, or a multiple linear regression analysis is applied to the transformed and untransformed calibration data sub-sets to obtain corresponding modeling equations for predicting the amount of the target substance in a sample. The modeling equation which provides the best correlation between the spectral data in the validation sub-set and the corresponding constituent values in the validation sub-set is identified, preferably as a function of the SEE and SEP.

67 Claims, 22 Drawing Sheets

U.S. PATENT DOCUMENTS

| | | | | |
|---|---|---|---|---|
| 5,119,819 | A | 6/1992 | Thomas | 128/660.02 |
| 5,121,338 | A | 6/1992 | Lodder | 364/498 |
| 5,137,023 | A | 8/1992 | Mendelson et al. | 128/633 |
| 5,139,023 | A | 8/1992 | Stanley et al. | 128/637 |
| 5,140,985 | A | 8/1992 | Schroeder et al. | 128/632 |
| 5,204,532 | A | 4/1993 | Rosenthal | 250/341 |
| 5,206,701 | A | 4/1993 | Taylor et al. | 356/325 |
| 5,223,714 | A | 6/1993 | Maggard | 250/343 |
| 5,223,715 | A | 6/1993 | Taylor | 250/343 |
| 5,242,602 | A | 9/1993 | Richardson et al. | 210/745 |
| 5,243,546 | A | 9/1993 | Maggard | 364/571.02 |
| 5,252,829 | A | 10/1993 | Nygaard et al. | 250/339 |
| 5,258,825 | A | 11/1993 | Reed et al. | 356/402 |
| 5,267,151 | A | 11/1993 | Ham et al. | 364/413.09 |
| 5,267,152 | A | 11/1993 | Yang et al. | 364/413.09 |
| 5,299,138 | A | 3/1994 | Fiori et al. | 364/498 |
| 5,307,263 | A | 4/1994 | Brown | 364/413.09 |
| 5,313,941 | A | 5/1994 | Braig et al. | 128/633 |
| 5,343,044 | A | 8/1994 | Sjaunja et al. | 250/339.09 |
| 5,348,002 | A | 9/1994 | Caro | 128/633 |
| 5,348,003 | A | 9/1994 | Caro | 128/633 |
| 5,349,188 | A | 9/1994 | Maggard | 250/339 |
| 5,349,189 | A | 9/1994 | Maggard | 250/339.07 |
| 5,360,972 | A | 11/1994 | DiFoggio et al. | 250/339.12 |
| 5,361,758 | A | 11/1994 | Hall et al. | 128/633 |
| 5,362,307 | A | 11/1994 | Guy et al. | 604/20 |
| 5,370,114 | A | 12/1994 | Wong et al. | 128/633 |
| 5,379,238 | A | * 1/1995 | Stark | 364/578 |
| 5,379,764 | A | 1/1995 | Barnes et al. | 128/633 |
| 5,383,452 | A | 1/1995 | Buchert | 128/633 |
| 5,433,197 | A | 7/1995 | Stark | 128/633 |
| 5,435,309 | A | 7/1995 | Thomas et al. | 128/633 |
| 5,446,681 | A | 8/1995 | Gethner et al. | 364/554 |
| 5,456,252 | A | 10/1995 | Vari et al. | 128/633 |
| 5,459,317 | A | 10/1995 | Small et al. | 250/341.1 |
| 5,459,677 | A | 10/1995 | Kowalski et al. | 364/571.02 |
| 5,481,476 | A | 1/1996 | Windig | 364/498 |
| 5,498,875 | A | 3/1996 | Obremski et al. | 250/458.1 |
| 5,512,751 | A | 4/1996 | Murray, Jr. et al. | 250/339.09 |
| 5,515,847 | A | 5/1996 | Braig et al. | 128/633 |
| 5,551,422 | A | 9/1996 | Simonsen et al. | 128/633 |
| 5,568,400 | A | 10/1996 | Stark et al. | 364/498 |
| 5,576,544 | A | 11/1996 | Rosenthal | 250/341.1 |
| 5,582,168 | A | 12/1996 | Samuels et al. | 128/633 |
| 5,602,755 | A | 2/1997 | Ashe et al. | 364/498 |
| 5,606,164 | A | 2/1997 | Price et al. | 250/339.09 |
| 5,610,836 | A | 3/1997 | Alsmeyer et al. | 364/498 |
| 5,615,672 | A | 4/1997 | Braig et al. | 128/633 |
| 5,638,816 | A | 6/1997 | Kiani-Azarbayjany et al. | 128/633 |
| 5,641,962 | A | 6/1997 | Perry et al. | 250/339.09 |
| 5,655,530 | A | 8/1997 | Messerschmidt | 128/633 |
| 5,657,754 | A | 8/1997 | Rosencwaig | 128/633 |
| 5,666,956 | A | 9/1997 | Buchert | 128/664 |
| 5,668,373 | A | 9/1997 | Rottat, Jr. et al. | 250/339.12 |
| 5,668,374 | A | 9/1997 | DiFoggio et al. | 250/339.12 |
| 5,672,875 | A | 9/1997 | Block et al. | 250/343 |
| 5,676,143 | A | 10/1997 | Simonsen et al. | 128/633 |
| 5,680,320 | A | 10/1997 | Helmer et al. | 364/498 |
| 5,680,321 | A | 10/1997 | Helmer et al. | 364/499 |
| 5,692,504 | A | 12/1997 | Essenpreis et al. | 128/633 |
| 5,706,208 | A | 1/1998 | Osten et al. | 364/497 |
| 5,710,630 | A | 1/1998 | Essenpreis et al. | 356/345 |
| 5,712,481 | A | 1/1998 | Welch et al. | 250/339.12 |
| 5,712,797 | A | 1/1998 | Descales et al. | 364/499 |
| 5,730,714 | A | 3/1998 | Guy et al. | 604/20 |
| 5,740,073 | A | 4/1998 | Bages et al. | 364/499 |
| 5,743,262 | A | 4/1998 | Lepper, Jr. et al. | 128/633 |
| 5,747,806 | A | 5/1998 | Khalil et al. | 250/339.12 |
| 5,750,994 | A | 5/1998 | Schlager | 250/339.11 |
| 5,752,512 | A | 5/1998 | Gozani | 128/635 |
| 5,771,891 | A | 6/1998 | Gozani | 128/635 |
| 5,782,755 | A | 7/1998 | Chance et al. | 600/322 |
| 5,788,632 | A | 8/1998 | Pezzaniti et al. | 600/316 |
| 5,798,526 | A | 8/1998 | Shenk et al. | 250/339.09 |
| 5,822,219 | A | 10/1998 | Chen et al. | 364/498 |
| 5,823,951 | A | 10/1998 | Messerschmidt | 600/322 |
| 5,823,966 | A | 10/1998 | Buchert | 600/473 |
| 5,830,132 | A | 11/1998 | Robinson | 600/310 |
| 5,830,133 | A | 11/1998 | Osten et al. | 600/322 |
| 5,841,523 | A | 11/1998 | Degen et al. | 356/72 |
| 5,857,462 | A | 1/1999 | Thomas et al. | 128/633 |
| 5,890,489 | A | 4/1999 | Elden | 128/898 |
| 5,896,198 | A | 4/1999 | Chou et al. | 356/349 |
| 5,900,634 | A | 5/1999 | Soloman | 250/339.11 |
| 5,910,109 | A | 6/1999 | Peters et al. | 600/316 |
| 5,933,792 | A | 8/1999 | Andersen et al. | 702/32 |
| 5,935,062 | A | 8/1999 | Messerchmidt et al. | 600/322 |
| 5,945,676 | A | 8/1999 | Khalil et al. | 250/339.12 |
| 5,946,128 | A | 8/1999 | Paek | 359/305 |
| 5,946,640 | A | 8/1999 | Goodacre et al. | 702/87 |
| 5,968,760 | A | 10/1999 | Phillips et al. | 435/14 |
| 5,985,120 | A | 11/1999 | Cholli et al. | 204/452 |
| 6,006,119 | A | 12/1999 | Soller et al. | 600/322 |
| 6,012,019 | A | 1/2000 | Saby | 702/32 |
| 6,014,577 | A | 1/2000 | Henning et al. | 600/345 |
| 6,026,314 | A | 2/2000 | Amerov et al. | 600/322 |
| 6,040,578 | A | 3/2000 | Malin et al. | 250/339.12 |
| 6,049,082 | A | 4/2000 | Methfessel | 250/339.09 |
| 6,061,582 | A | 5/2000 | Small et al. | 600/316 |
| 6,064,065 | A | 5/2000 | Block et al. | 250/341.3 |
| 6,064,897 | A | 5/2000 | Lindberg et al. | 600/316 |
| 6,066,847 | A | 5/2000 | Rosenthal | 250/252.1 |
| 6,067,463 | A | 5/2000 | Jeng et al. | 600/336 |
| 6,070,128 | A | 5/2000 | Descales et al. | 702/30 |
| 6,087,182 | A | 7/2000 | Jeng et al. | 436/66 |
| 6,087,662 | A | 7/2000 | Wilt et al. | 250/339.12 |
| 6,091,843 | A | 7/2000 | Horesh et al. | 382/133 |
| 6,110,522 | A | 8/2000 | Lepper, Jr. et al. | 427/2.11 |
| 6,114,699 | A | 9/2000 | Barton et al. | 250/339.09 |
| 6,115,673 | A | * 9/2000 | Malin et al. | 702/23 |
| 6,124,134 | A | 9/2000 | Stark | 436/63 |
| 6,137,108 | A | 10/2000 | DeThomas et al. | 250/339.07 |
| 6,151,517 | A | 11/2000 | Honigs et al. | 600/322 |
| 6,157,041 | A | 12/2000 | Thomas et al. | 250/573 |
| 6,159,255 | A | 12/2000 | Perkins | 44/300 |
| 6,161,028 | A | 12/2000 | Braig et al. | 600/316 |
| 6,181,957 | B1 | 1/2001 | Lambert et al. | 600/319 |
| 6,219,565 | B1 | 4/2001 | Cupp et al. | 600/310 |
| 6,236,047 | B1 | 5/2001 | Malin et al. | 250/339.12 |
| 6,309,884 | B1 | 10/2001 | Cooper et al. | 436/14 |

FOREIGN PATENT DOCUMENTS

| | | | |
|---|---|---|---|
| EP | 0680727 | 11/1995 | A61B/5/00 |
| EP | 0461207 | 2/1996 | A61B/5/00 |
| EP | 0577684 | 5/1997 | G01N/21/31 |
| EP | 0637217 | 3/1998 | A61B/5/00 |
| WO | 9505599 | 2/1995 | G01N/33/50 |
| WO | 9702781 | 1/1997 | A61B/5/00 |
| WO | 9725915 | 7/1997 | A61B/5/00 |
| WO | 9730629 | 8/1997 | A61B/5/00 |
| WO | 9743947 | 11/1997 | A61B/5/00 |
| WO | 9837805 | 9/1998 | A61B/5/00 |
| WO | 9852469 | 11/1998 | A61B/6/00 |
| WO | 9939631 | 2/1999 | A61B/5/00 |
| WO | 9922639 | 5/1999 | A61B/5/00 |
| WO | 9951142 | 10/1999 | A61B/5/00 |

OTHER PUBLICATIONS

Harrington, P., *Temperature–Constrained Backpropagation Neural Networks*, Analytical Chemistry, vol. 66, No. 6, pp. 802–807 (Mar. 15, 1994).

Osborne, B.G., et al., *Practical NIR Spectroscopy, with Applications in Food and Beverage Analysis*, Longman Scientific and Technical (2d Edition) (1993).

Mark, H., *Use of Mahalanobis Distances To Evaluate Sample Preparation Methods for Near–IOnfrared Reflectance Analysis*, Analytical Chemistry, vol. 59, No. 5, pp. 790–795 (Mar. 1, 1987).

Mark, H., *Normalized Distances for Qualitative Near–Infrared Reflectance Analysis*, Analytical Chemistry, vol. 58, No. 2, pp. 379–456 (Feb. 1986).

Honigs D.E., et al., *Unique–Sample Selection via Near–Infrared Spectral Subtraction*, Anlaytical Chemistry, vol. 57, No. 12, pp. 2299–2303 (Oct. 1985).

Mark, H.L. and Tunnell, D., *Qualitative Near–Infrared Reflectance Analysis Using Mahalanobis Distances*, Analytical Chemistry, vol. 57, No. 7, pp. 1449–1456 (Jun. 1985).

Savitzky, A. and Golay, M.J.E., *Smoothing and Differentiation of Data by Simplified Least Squares Procedures*, Analytical Chemistry, vol. 36, No. 8, pp. 1627–1640 (Jul. 1964).

Peuchant, E., Salles, C., Jensen, R.; "Determination of Serum Cholesterol by Near–Infrared Reflectance Spectrometry," *Analytical Chemistry*, vol. 59, No. 14, pp. 1816–1819 (Jul. 15, 1987).

Small, G.W., Arnold, M.A., Marquardt, LA.; "Strategies for Coupling Digital Filtering with Partial Least–Squares Regression: Application to the Determination of Glucose in Plasma by Fourier Transform Near–Infrared Spectroscopy," *Analytical Chemistry*, vol. 65, pp. 3279–3289 (1993).

Kruggel W.G., et al., "Near–Infrared Reflectance Determination of Fat, Protein, and Moisture in Fresh Meat," *J. Assoc. Off. Anal. Chem.*, vol. 64, No. 3, pp. 692–696 (1981).

Arnold, M.A., "Motivation for Developing Optical Sensors for Blood Electrolyte Measurement"; *Clinical Chemnistry*, vol. 37, No. 8, pp. 1319–1320 (1991).

Shengtian Pan, et al., "Near–Infrared Spectroscopic Measurement of Physiological Glucose Levels in Variable Matrices of Protein and Triglycerides", *Anal. Chem.*, vol. 68, No. 7, pp. 1124–1135 (Apr. 1, 1996).

Marquardt, Lois A., et al., "Near–Infrared Spectroscopic Measurement of Glucose in a Protein Matrix", *Analytical Chemistry*, vol. 65, No. 22, pp. 3271–3278 (Nov. 15, 1993).

Arnold, Mark A., et al., "Determination of Physiological Levels of Glucose in an Aqueous Matrix with Digitally Filtered Fourier Transform Near–Infrared Spectra", *Analytical Chemistry*, vol. 62, No. 14, pp. 1457–1464 (Jul. 15, 1990).

Zee, Van Der P., et al. "Simulation of the Point Spread Function for Light in Tissue by a Monte Carlo Method," *Department of Medical Physics and Bioengineering, University College Hospital, Shropshire House, Capper Street, London Wc1E 6JA, U.K.*, pp. 179–191.

Takada, M., et al., "Non–Invasive Near–Infrared Measurements of Human Arm Tissue In Vivo," R & D Engineering-Spectrophotometric, Instrument Analytical Instrument Division, Shimadzu Corporation, Nakagyo–ku, Kyoto 604, and *Biophysics Division, Research Institute of Applied Electricity, Hokkaido University, Sapporo 060, Japan., pp. 301–304.

Heise, H.M., et al. "Noninvasive Blood Glucose Sensors Based on Near–Infrared Spectroscopy", *Artif Organs*, vol. 18, No. 6, pp. 439–447 (Nov. 6, 1994).

Glaister, D.H., "Current and Emergining Technology in G–Loc Detection: Noninvasive Monitoring of Cerebral Microcirculation Using Near Infrared", *Aviation, Space, and Environmental Medicine*, pp. 23–28 (Jan. 1988).

Burfeindt, J., et al., "Angewandte optische Untersuchungen im nahen Infrarot– und Rotbereich an Humanvollblut; Anwendungsbeispiele", *Biomedizinische Technik Band 30, Heft 1–2/1985*, pp. 18–23.

Muller, U.A., et al., "Non–invasive Blood Glucose Monitoring by Means of Near Infrared Spectroscopy: Methods for Improving the Reliability of the Calibration Models," *The International Journal of Artificial Organs*, vol. 20, pp. 285–290 (Nov. 5, 1997).

Arnold, Mark A., "Non–invasive Glucose Monitoring", *Current Opinion in Biotechnology*, 1996, 7:46–49.

Eggert, Hans R., et al., "Optical Properties of Human Brain Tissue, Meninges,m and Brain Tumors in the Spectral Range of 200 to 900 nm", *Neurosurgery*, vol. 21, No. 4, pp. 459–464 (1987).

Giannini, Ivo et al., "Rat Brain Monitoring by Near–Infrared Spectroscopy; An Assessment of Possible Clincal Significance" *Physiol. Chem. Phys.*, 14, pp. 295–305 (1982).

Israel, Richard G., et al., "Validity of a Near–Infrared Spectrophotometry Device for Estimating Human Body Composition", *Research Quarterly for Exercise and Sport*, vol. 60, No. 4, pp. 379–383 (1989).

Blazek,, V., "Verhalten der menschlichen Haut gegenuber Elektromagnetischer Strahlung im Sichtbaren Und Nahen IR–Bereich", *Z. Rechtsmedizin 77*, 99–103 (1976).

van Toorenbergen, A.W., et al., "Measurement of Total Serum Protein by Near–Infrared Reflectance Spectroscopy," *J. Clin. Chem. Clin. Biochem.*, vol. 26, No. 4, pp. 209–211 (1988).

Ciurczak, E.W., et al., "Chapter II.B.2 Identification of Actoves in Multicomponent Pharmaceutical Dosage Forms Using Near–Infrared Reflectance Analysis;" *Molecular Spectroscopy Workbench*, pp. 89–109, John Wiley & Sons, Inc. (1998).

Ciurczak, E.W., et al., "Chapter II.B.8 Analysis of Solid and Liquid Dosage Forms Using Near–Infrared Reflectance Spectroscopy," *Molecular Spectroscopy Workbench*, pp. 143–149, Joh Wiley & Sons, Inc. (1998).

Ciurczak, E.W., et al., "Chapter II.C. 1 Chemometrics: A Powerful Toolbox For UV/VIS Spectroscopy;" *Molecular Spectroscopy Workbench*, pp. 165–172, John Wiley & Sons, Inc. (1998).

Ciurczak, E.W., et al., "Chapter III.1 Purgamenta Inuit, Purgamenta Exiunt;" *Molecular Spectroscopy Workbench*, pp. 315–317, John Wiley & Sons, Inc. (1998).

Burns, D.A., et al., "Chapter 4 Commercial NIR Instrumentation," *Handbook of Near–Infrared Analysis*, pp. 37–51, Mracel Dekker, Inc. (1992).

Burns, D.A., et al., "Chapter 5 Process Analysis," *Handbook of Near–Infrared Analysis*, pp. 53–105, Mracel Dekker, Inc. (1992).

Burns, D.A., et al., "Chapter 6 Data Analysis: Multilinear Regression and Principal Component Analysis," *Handbook of Near–Infrared Analysis*, pp. 107–158, Mracel Dekker, Inc. (1992).

Burns, D.A., et al., "Chapter 7 Data Analysis: Calibration of NIR Instruments by PLS Regression," *Handbook of Near–Infrared Analysis*, pp. 159–180, Mracel Dekker, Inc. (1992).

Burns, D.A., et al., "Chapter 10 NIR Spectroscopy Calibration Basics," *Handbook of Near–Infrared Analysis*, pp. 247–280, Mracel Dekker, Inc. (1992).

Burns, D.A., et al., "Chapter 13 Qualitative Discriminant Analysis," *Handbook of Near–Infrared Analysis*, pp. 329–363, Mracel Dekker, Inc. (1992).

Burns, D.A., et al., "Chapter 20 NIR Analysis of Pharmaceuticals," *Handbook of Near–Infrared Analysis*, pp. 549–563, Mracel Dekker, Inc. (1992).

Harrington, P.B.; "Temperature–Constrained Backpropagation Neural Networks," *Analytical Chemistry*, vol. 66, pp. 802–807 (1994).

Savitsky, A and Golay, Marcel J.E.; "Smoothing and Differentiation of Data by Simplified Least Squares Procedures," *Analytical Chemistry*, vol. 36, No. 8 (1964).

Osborne, B.G., Fearn, T. and Hindle, P.H.; "Practical NIR Spectroscopy, With Applications in Food and Beverage Analysis," $2^{nd}$ Ed, *Longman Scientific and Technical*, pp. 114–116 (1993).

Draper, N. and Smith, H.; "Chapter 14 Dummy Variables," *Applied Regression Analysis*, $3^{rd}$ Ed, pp. 299–324 (1998).

Mark, H.; "Use of Mahalanobis Distances To Evaluate Sample Preparation Methods for Near–Infrared Reflectance Analysis," *Analytical Chemistry*, vol. 59, pp. 790–795 (1987).

Mark, H.; "Normalized Distances for Qualitative Near–Infrared Reflectance Analysis," *Analytical Chemistry*, vol. 58, pp. 379–384 (1986).

Mark, H. and Tunnell, D.; "Qualitative Near–Infrared Reflectance Analysis Using Mahalanobis Distances," *Analytical Chemistry*, vol. 57, pp. 1446–1456 (1985).

Honigs, D.E., Hieftje, G.M., Mark, H.L., Hirschfeld, T.B.; "Unique–Sample Selection via Near–Infrared Spectral Subtraction," *Analytical Chemistry*, vol. 57, pp. 2299–2303 (1985).

* cited by examiner 31  176  2  1100  2500
PROT1     PROT2
| | | | | |
|---|---|---|---|---|
| 6.80  | 0.100420 | ... 0.772786 | 14.900000 | 15.000000 |
| 3.80  | 0.098339 | ... 0.753069 | 15.800000 | 16.000000 |
| 18.80 | 0.100975 | ... 0.749604 | 15.000000 | 15.150000 |
| 7.80  | 0.100414 | ... 0.787344 | 11.900000 | 11.850000 |
| 13.80 | 0.108471 | ... 0.760540 | 14.000000 | 13.950000 |
| 26.80 | 0.099296 | ... 0.761200 | 16.400000 | 16.600000 |
| 9.80  | 0.099912 | ... 0.758483 | 17.049999 | 16.850000 |
| 8.80  | 0.099030 | ... 0.759844 | 16.900000 | 16.900000 |
| 17.80 | 0.099232 | ... 0.766696 | 16.000000 | 16.200001 |
| 4.80  | 0.098093 | ... 0.759895 | 14.400000 | 14.600000 |
| 29.80 | 0.099570 | ... 0.768159 | 16.049999 | 16.250000 |
| 30.80 | 0.101062 | ... 0.769265 | 13.550000 | 13.700000 |
| 20.80 | 0.099621 | ... 0.762239 | 15.300000 | 15.400000 |
| 15.80 | 0.098261 | ... 0.779224 | 14.000000 | 13.950000 |
| 31.80 | 0.099160 | ... 0.766651 | 13.850000 | 14.000000 |
| 24.80 | 0.096580 | ... 0.749691 | 16.000000 | 15.950000 |
| 14.80 | 0.097305 | ... 0.766814 | 12.650000 | 12.750000 |
| 23.80 | 0.097746 | ... 0.759174 | 12.900000 | 12.800000 |
| 21.80 | 0.097175 | ... 0.755211 | 16.350000 | 16.200001 |
| 22.80 | 0.096905 | ... 0.763963 | 12.300000 | 12.100000 |
| 19.80 | 0.096293 | ... 0.752276 | 14.750000 | 14.850000 |
| 1.80  | 0.097834 | ... 0.776039 | 11.450000 | 11.350000 |
| 25.80 | 0.101910 | ... 0.762981 | 13.400000 | 13.200000 |
| 11.80 | 0.098234 | ... 0.734357 | 14.100000 | 13.800000 |
| 5.80  | 0.095808 | ... 0.744821 | 15.700000 | 15.850000 |
| 27.80 | 0.098611 | ... 0.776781 | 15.550000 | 15.750000 |
| 12.80 | 0.096416 | ... 0.751289 | 15.900000 | 15.650000 |
| 16.80 | 0.097519 | ... 0.774169 | 12.300000 | 12.500000 |
| 10.80 | 0.097216 | ... 0.757946 | 13.450000 | 13.550000 |
| 2.80  | 0.096016 | ... 0.755671 | 13.600000 | 13.850000 |
| 28.80 | 0.098312 | ... 0.771444 | 15.200000 | 15.050000/// |

FIG. 15

DIFFUSE REFLECTANCE TRANSFORMS

SECOND TRANSFORM:

| 1ST TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS | | 1 | 1 | 1 | 1 | 1 | 1 | 1 | 1 | 0 | 1 | 1 | 1 |
| BASECORR | | 0 | 0 | 1 | 1 | 1 | 0 | 0 | 1 | 1 | 0 | 1 | 1 | 1 |
| NORMALIZ | | 0 | 1 | 0 | 1 | 1 | 0 | 0 | 1 | 0 | 0 | 1 | 1 | 1 |
| FIRSTDRV | | 0 | 0 | 1 | 0 | 0 | 0 | 0 | 1 | 0 | 0 | 0 | 0 | 0 |
| SECNDDRV | | 0 | 0 | 1 | 0 | 0 | 0 | 0 | 1 | 0 | 0 | 0 | 0 | 0 |
| MULTSCAT | | 0 | 0 | 0 | 1 | 1 | 0 | 1 | 1 | 0 | 0 | 1 | 1 | 1 |
| KUBLMUNK | | 0 | 1 | 1 | 1 | 1 | 1 | 0 | 1 | 0 | 0 | 1 | 1 | 0 |
| SMOOTHNG | | 0 | 1 | 1 | 1 | 1 | 1 | 1 | 0 | 0 | 0 | 1 | 1 | 1 |
| RATIO | | 0 | 0 | 0 | 0 | 0 | 0 | 0 | 0 | 0 | 0 | 0 | 0 | 0 |
| MEANCNTR | | 0 | 0 | 0 | 0 | 0 | 0 | 0 | 0 | 0 | 0 | 0 | 0 | 0 |
| SGDERIV1 | | 0 | 0 | 1 | 0 | 0 | 0 | 0 | 1 | 0 | 0 | 0 | 0 | 0 |
| SGDERIV2 | | 0 | 0 | 1 | 0 | 0 | 0 | 0 | 1 | 0 | 0 | 0 | 0 | 0 |
| ABS2REFL | | 0 | 1 | 1 | 1 | 1 | 1 | 0 | 1 | 0 | 0 | 1 | 1 | 0 |

*FIG. 16A*

DIFFUSE REFLECTANCE RATIOS

DENOMINATOR TRANSFORM

| NUMERATOR TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS    | 1 | 1 | 0 | 0 | 0 | 0 | 0 | 0 | 0 | 0 | 0 | 0 | 0 |
| BASECORR | 0 | 1 | 0 | 0 | 0 | 0 | 0 | 0 | 0 | 0 | 0 | 0 | 0 |
| NORMALIZ | 0 | 1 | 1 | 0 | 0 | 0 | 0 | 0 | 0 | 0 | 0 | 0 | 0 |
| FIRSTDRV | 1 | 0 | 0 | 1 | 0 | 0 | 0 | 0 | 0 | 0 | 0 | 0 | 0 |
| SECNDDRV | 1 | 0 | 0 | 0 | 1 | 0 | 0 | 0 | 0 | 0 | 0 | 0 | 0 |
| MULTSCAT | 0 | 1 | 0 | 0 | 0 | 1 | 0 | 0 | 0 | 0 | 0 | 0 | 0 |
| KUBLMUNK | 0 | 1 | 0 | 0 | 0 | 0 | 1 | 0 | 0 | 0 | 0 | 0 | 0 |
| SMOOTHNG | 0 | 1 | 0 | 0 | 0 | 0 | 0 | 1 | 0 | 0 | 0 | 0 | 0 |
| RATIO    | 0 | 0 | 0 | 0 | 0 | 0 | 0 | 0 | 0 | 0 | 0 | 0 | 0 |
| MEANCNTR | 0 | 0 | 0 | 0 | 0 | 0 | 0 | 0 | 0 | 0 | 0 | 0 | 0 |
| SGDERIV1 | 1 | 0 | 0 | 0 | 0 | 0 | 0 | 0 | 0 | 0 | 1 | 0 | 0 |
| SGDERIV2 | 1 | 0 | 0 | 0 | 0 | 0 | 0 | 0 | 0 | 0 | 0 | 1 | 0 |
| ABS2REFL | 0 | 1 | 0 | 0 | 0 | 0 | 0 | 0 | 0 | 0 | 0 | 0 | 1 |

FIG. 16B

DIFFUSE TRANSMITTANCE TRANSFORMS

SECOND TRANSFORM:

| 1ST TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS    | 1 | 1 | 1 | 1 | 1 | 1 | 0 | 1 | 1 | 0 | 1 | 1 | 1 |
| BASECORR | 0 | 0 | 1 | 1 | 1 | 0 | 0 | 1 | 1 | 0 | 1 | 1 | 1 |
| NORMALIZ | 0 | 1 | 0 | 1 | 1 | 0 | 0 | 1 | 0 | 0 | 1 | 1 | 1 |
| FIRSTDRV | 0 | 0 | 1 | 0 | 0 | 0 | 0 | 1 | 0 | 0 | 0 | 0 | 0 |
| SECNDDRV | 0 | 0 | 1 | 0 | 0 | 0 | 0 | 1 | 0 | 0 | 0 | 0 | 0 |
| MULTSCAT | 0 | 0 | 0 | 1 | 1 | 0 | 0 | 1 | 0 | 0 | 1 | 1 | 1 |
| KUBLMUNK | 0 | 0 | 0 | 0 | 0 | 0 | 0 | 0 | 0 | 0 | 0 | 0 | 0 |
| SMOOTHNG | 0 | 1 | 1 | 1 | 1 | 1 | 0 | 0 | 0 | 0 | 1 | 1 | 1 |
| RATIO    | 0 | 0 | 0 | 0 | 0 | 0 | 0 | 0 | 0 | 0 | 0 | 0 | 0 |
| MEANCNTR | 0 | 0 | 0 | 0 | 0 | 0 | 0 | 0 | 0 | 0 | 0 | 0 | 0 |
| SGDERIV1 | 0 | 0 | 1 | 0 | 0 | 0 | 0 | 1 | 0 | 0 | 0 | 0 | 0 |
| SGDERIV2 | 0 | 0 | 1 | 0 | 0 | 0 | 0 | 1 | 0 | 0 | 0 | 0 | 0 |
| ABS2REFL | 0 | 1 | 1 | 1 | 1 | 1 | 0 | 1 | 0 | 0 | 1 | 1 | 0 |

FIG. 17A

DIFFUSE TRANSMITTANCE RATIOS

DENOMINATOR TRANSFORM

| NUMERATOR TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS    | 1 | 1 | 0 | 0 | 0 | 0 | 0 | 0 | 0 | 0 | 0 | 0 | 0 |
| BASECORR | 0 | 1 | 0 | 0 | 0 | 0 | 0 | 0 | 0 | 0 | 0 | 0 | 0 |
| NORMALIZ | 0 | 1 | 1 | 0 | 0 | 0 | 0 | 0 | 0 | 0 | 0 | 0 | 0 |
| FIRSTDRV | 1 | 0 | 0 | 1 | 0 | 0 | 0 | 0 | 0 | 0 | 0 | 0 | 0 |
| SECNDDRV | 1 | 0 | 0 | 0 | 1 | 0 | 0 | 0 | 0 | 0 | 0 | 0 | 0 |
| MULTSCAT | 0 | 1 | 0 | 0 | 0 | 1 | 0 | 0 | 0 | 0 | 0 | 0 | 0 |
| KUBLMUNK | 0 | 0 | 0 | 0 | 0 | 0 | 0 | 0 | 0 | 0 | 0 | 0 | 0 |
| SMOOTHNG | 0 | 1 | 0 | 0 | 0 | 0 | 0 | 1 | 0 | 0 | 0 | 0 | 0 |
| RATIO    | 0 | 0 | 0 | 0 | 0 | 0 | 0 | 0 | 0 | 0 | 0 | 0 | 0 |
| MEANCNTR | 0 | 0 | 0 | 0 | 0 | 0 | 0 | 0 | 0 | 0 | 0 | 0 | 0 |
| SGDERIV1 | 1 | 0 | 0 | 0 | 0 | 0 | 0 | 0 | 0 | 0 | 1 | 0 | 0 |
| SGDERIV2 | 1 | 0 | 0 | 0 | 0 | 0 | 0 | 0 | 0 | 0 | 0 | 1 | 0 |
| ABS2REFL | 0 | 1 | 0 | 0 | 0 | 0 | 0 | 0 | 0 | 0 | 0 | 0 | 1 |

FIG. 17B

CLEAR TRANSMITTANCE TRANSFORMS

SECOND TRANSFORM:

| 1ST TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS    | 1 | 1 | 1 | 1 | 1 | 0 | 0 | 1 | 1 | 0 | 1 | 1 | 1 |
| BASECORR | 0 | 0 | 1 | 1 | 1 | 0 | 0 | 1 | 1 | 0 | 1 | 1 | 1 |
| NORMALIZ | 0 | 1 | 0 | 1 | 1 | 0 | 0 | 1 | 0 | 0 | 1 | 1 | 1 |
| FIRSTDRV | 0 | 0 | 1 | 0 | 0 | 0 | 0 | 1 | 0 | 0 | 0 | 0 | 0 |
| SECNDDRV | 0 | 0 | 1 | 0 | 0 | 0 | 0 | 1 | 0 | 0 | 0 | 0 | 0 |
| MULTSCAT | 0 | 0 | 0 | 0 | 0 | 0 | 0 | 0 | 0 | 0 | 0 | 0 | 0 |
| KUBLMUNK | 0 | 0 | 0 | 0 | 0 | 0 | 0 | 0 | 0 | 0 | 0 | 0 | 0 |
| SMOOTHNG | 0 | 1 | 1 | 1 | 1 | 0 | 0 | 0 | 0 | 0 | 1 | 1 | 1 |
| RATIO    | 0 | 0 | 0 | 0 | 0 | 0 | 0 | 0 | 0 | 0 | 0 | 0 | 0 |
| MEANCNTR | 0 | 0 | 0 | 0 | 0 | 0 | 0 | 0 | 0 | 0 | 0 | 0 | 0 |
| SGDERIV1 | 0 | 0 | 1 | 0 | 0 | 0 | 0 | 1 | 0 | 0 | 0 | 0 | 0 |
| SGDERIV2 | 0 | 0 | 1 | 0 | 0 | 0 | 0 | 1 | 0 | 0 | 0 | 0 | 0 |
| ABS2REFL | 0 | 1 | 1 | 1 | 1 | 0 | 0 | 1 | 0 | 0 | 1 | 1 | 0 |

FIG. 18A

CLEAR TRANSMITTANCE RATIOS

DENOMINATOR TRANSFORM

| NUMERATOR TRANSFORM | NULLS | BASECORR | NORMALIZ | FIRSTDRV | SECNDDRV | MULTSCAT | KUBLMUNK | SMOOTHNG | RATIO | MEANCNTR | SGDERIV1 | SGDERIV2 | ABS2REFL |
|---|---|---|---|---|---|---|---|---|---|---|---|---|---|
| NULLS     | 1 | 1 | 0 | 0 | 0 | 0 | 0 | 0 | 0 | 0 | 0 | 0 | 0 |
| BASECORR  | 0 | 1 | 0 | 0 | 0 | 0 | 0 | 0 | 0 | 0 | 0 | 0 | 0 |
| NORMALIZ  | 0 | 1 | 1 | 0 | 0 | 0 | 0 | 0 | 0 | 0 | 0 | 0 | 0 |
| FIRSTDRV  | 1 | 0 | 0 | 1 | 0 | 0 | 0 | 0 | 0 | 0 | 0 | 0 | 0 |
| SECNDDRV  | 1 | 0 | 0 | 0 | 1 | 0 | 0 | 0 | 0 | 0 | 0 | 0 | 0 |
| MULTSCAT  | 0 | 0 | 0 | 0 | 0 | 0 | 0 | 0 | 0 | 0 | 0 | 0 | 0 |
| KUBLMUNK  | 0 | 0 | 0 | 0 | 0 | 0 | 0 | 0 | 0 | 0 | 0 | 0 | 0 |
| SMOOTHNG  | 0 | 1 | 0 | 0 | 0 | 0 | 0 | 1 | 0 | 0 | 0 | 0 | 0 |
| RATIO     | 0 | 0 | 0 | 0 | 0 | 0 | 0 | 0 | 0 | 0 | 0 | 0 | 0 |
| MEANCNTR  | 0 | 0 | 0 | 0 | 0 | 0 | 0 | 0 | 0 | 0 | 0 | 0 | 0 |
| SGDERIV1  | 1 | 0 | 0 | 0 | 0 | 0 | 0 | 0 | 0 | 0 | 1 | 0 | 0 |
| SGDERIV2  | 1 | 0 | 0 | 0 | 0 | 0 | 0 | 0 | 0 | 0 | 0 | 1 | 0 |
| ABS2REFL  | 0 | 1 | 0 | 0 | 0 | 0 | 0 | 0 | 0 | 0 | 0 | 0 | 1 |

FIG. 18B

AUTOMATED SYSTEM AND METHOD FOR SPECTROSCOPIC ANALYSIS

Throughout this application, various patents and publications are referred to. Disclosure of these publications and patents in their entirety are hereby incorporated by reference into this application to more fully describe the state of the art to which this invention pertains.

FIELD OF THE INVENTION

The present invention relates to the field of qualitative and quantitative spectroscopic analysis.

BACKGROUND OF THE INVENTION

Infrared spectroscopy is a technique which is based upon the vibrational changes of the atoms of a molecule. In accordance with infrared spectroscopy, an infrared spectrum is generated by transmitting infrared radiation through a sample of an organic compound and determining what portion of the incident radiation are absorbed by the sample. An infrared spectrum is a plot of absorbance (or transmittance) against wavenumber, wavelength, or frequency. Infrared radiation is radiation having a wavelength between about 750 nm and about 1000 $\mu$m. Near-infrared radiation is radiation having a wavelength between about 750 nm and about 2500 nm.

In order to identify the presence and/or concentration of an analyte in a sample, the near-infrared reflectance or transmittance of a sample is measured at several discrete wavelengths, converted to absorbance or its equivalent reflectance term and then multiplied by a series of regression or weighting coefficients calculated through multiple-linear-regression mathematics.

In the past, analysis was done only via transmission measurements from clear solutions, using solvents having little or no absorbency at the wavelength of the analyte. The absorbance (A) of an analyte in a non-absorbing solution at a specified wavelength, is represented by the equation abc, wherein a is the absorptivity constant, b is the pathlength of light through the samples and c is the concentration of the analyte. In this prior art system, the calibration sample consisted of a predetermined set of standards (i.e. samples of a known composition) which were run under the same conditions as the unknown samples, thereby allowing for the determination of the concentration of the unknowns.

In early infrared radiation analysis, deviations from Beer's law caused for example, by instrument noise or a nonlinear relationship between absorbency and concentration were common. Calibration curves, determined empirically, were required for quantitative work. The analytical errors associated with quantitative infrared analysis needed to be reduced to the level associated with ultraviolet and visible methods. Least-squares analysis allowed the chemist to determine a calibration equation. The spectroscopic data (Y) was the dependent variable and the standard concentrations were the independent variable (X).

Various methods have been developed to improve and expedite the interpretation of NIRA spectra. Examples of methods of processing NIRA spectral data to generate a comparison factor to be used in determining the similarity between the composition of a test sample and a standard material are found in U.S. Pat. No. 5,023,804 issued Aug. 23, 1988 to Hoult; U.S. Pat. No. 4,766,551 issued Aug. 23, 1988 to Begley; U.S. Pat. No. 5,900,634 issued May 4, 1999 to Soloman; U.S. Pat. No. 5,610,836 issued Mar. 11, 1997 to Alsmeyer et al.; U.S. Pat. No. 5,481,476 issued Jan. 2, 1996 to Windig; U.S. Pat. No. 5,822,219 issued Oct. 13, 1998 to Chen et al.

Instruments have improved enormously. The noise and drifts associated with earlier instruments have improved with the changeover of electronic circuitry from tubes to semiconductor circuits. Modem applications of spectroscopy, and particularly near-infrared spectroscopy, have gone away from the simple two-component mixtures to analysis of multi-component mixtures of an unknown nature (e.g., natural products). However, because of the of the large amount of sample variance in multi-component mixtures use of the standard set is no longer possible.

The net result of the evolution of NIRA is to interchange the roles of the spectroscopic and standard values for the calibration samples. Previously, the standard values (i.e., the composition of the known samples) were considered to be more accurate than the spectral data. However, now that the calibration samples are a multi-component mixtures of unknown nature, it is the spectroscopic values that are known with better precision and accuracy.

SUMMARY OF THE INVENTION

In accordance with the present invention, an automated method for modeling spectral data is provided. The samples are analyzed and spectral data is collected by the method of diffuse reflectance, clear transmission, or diffuse transmission. In addition, for each sample, one or more constituent values are measured. In this regard, a constituent value is a reference value for the target substance in the sample which is measured by a independent measurement technique. As an example, a constituent value used in conjunction with identifying a target substance in a pharmaceutical tablet sample might be the concentration of that substance in the tablet sample as measured by high pressure liquid chromatography (HPLC) analysis. In this manner, the spectral data for each sample has associated therewith at least one constituent value for that sample.

The set of spectral data (with its associated constituent values) is divided into a calibration sub-set and a validation sub-set. The calibration sub-set is selected to represent the variability likely to be encountered in the validation sub-set.

In accordance with a first embodiment of the present invention, a plurality of data transforms is then applied to the set of spectral data. Preferably, the transforms are applied singularly and two-at-a-time. The particular transforms used, and the particular combination pairs used, are selected based upon the particular method used to analyze the spectral data (e.g. diffuse reflectance, clear transmission, or diffuse transmission as discussed in the detailed description). Preferably, the entries are contained in an external data file, so that the user may change the list to conform to his own needs and judgement as to what constitutes sensible transform pairs. Preferably, the plurality of transforms applied to the spectral data includes at least a second derivative and a baseline correction. In accordance with a further embodiment of the, present invention, transforms include, but are not limited to the following: performing a normalization of the spectral data, performing a first derivative on the spectral data, performing a second derivative on the spectral data, performing a multiplicative scatter correction on the spectral data, in performing smoothing transforms on the spectral data. In this regard, it should be noted that both the normalization transform and the multiplicative scatter correction transform inherently also perform baseline corrections.

Preferably, the normalization transform is combined with each of the first derivative, second derivative, and smoothing transforms; the first derivative transform is combined with the normalization, and smoothing transforms; the second derivative transform is combined with the normalization and smoothing transforms; the multiplicative scatter correction transform is combined with absorption-to-reflection, first derivative, second derivative, Kubelka-Munk, and smoothing transforms; the Kubelka-Munk transform is combined with the normalization, first derivative, second derivative, multiplicative scatter correction, and smoothing transforms; the smoothing transform is combined with the absorption-to-reflection, normalization, first derivative, second derivative, multiplicative scatter correction, and Kubelka-Munk transforms; and the absorption-to-reflection transform is combined with the normalization, first derivative, second derivative, multiplicative scatter correction, and smoothing transforms. In this manner a set of transformed and untransformed calibration and validation data sets are created.

In a further preferred embodiment, the plurality of transforms applied to the spectral data may further include performing a Kubelka-Munk function, performing a Savitsky-Golay first derivative, performing a Savitsky-Golay second derivative, performing a mean-centering, or performing a conversion from reflectance/transmittance to absorbance.

In one preferred embodiment, the data transforms include performing a second derivative on the spectral data; and performing a normalization, a multiplicative scatter correction or a smoothing transform of the spectral data. In another preferred embodiment the data transforms include performing a normalization of the spectral data; and a smoothing transform, a Savitsky-Golay first derivative, or a Savitsky-Golay second derivative of the spectral data. In another embodiment the data transforms include performing a first derivative of the spectral data; and a normalization, a multiplicative scatter correction, or a smoothing transform on the spectral data.

The plurality of data transforms in the embodiments described above may also include a ratio transform, wherein the ratio transform includes a numerator and a denominator and wherein at least one of the numerator and the denominator is another transform. Most preferably: the numerator comprises one of a baseline correction, a normalization, a multiplicative scatter correction, a smoothing transform, a Kubelka-Munk function, or conversion from reflectance/transmittance to absorbance when the denominator comprises a baseline correction; the numerator comprises a normalization when the denominator comprises a normalization; the numerator comprises a first derivative when the denominator comprises a first derivative; the numerator comprises a second derivative when the denominator comprises a second derivative; the numerator comprises a multiplicative scatter correction when the denominator comprises a multiplicative scatter correction; the numerator comprises a Kubelka-Munk function when the denominator comprises a Kubelka-Munk function; the numerator comprises a smoothing transform when the denominator comprises a smoothing transform; the numerator comprising a Savitsky-Golay first derivative when the denominator comprises a Savitsky-Golay first derivative; and/or the numerator comprises a Savitsky-Golay second derivative when the denominator comprises a Savitsky-Golay second derivative.

One or more of a partial least squares, a principal component regression, a neural net, a classical least squares (often abbreviated CLS, and sometimes called The K-matrix Algorithm) or a multiple linear regression analysis (MLR calculations may, for example, be performed using software from The Near Infrared Research Corporation, 21 Terrace Avenue, Suffern, N.Y. 10901) are then performed on the transformed and untransformed (i.e. NULL transform) calibration data sub-sets to obtain corresponding modeling equations for predicting the amount of the target substance in a sample. Preferably, the partial least squares, principal component regression and multiple linear regression are performed on the transformed and untransformed calibration and validation data sets.

The modeling equations are ranked to select a best model for analyzing the spectral data. In this regard, for each sample in the validation sub-set, the system determines, for each modeling equation, how closely the value returned by the modeling equation is to the constituent value(s) for the sample. The best modeling equation is the modeling equation which, across all of the samples in the validation sub-set, returned the closest values to the constituent values: i.e., the modeling equation which provided the best correlation to the constituent values. Preferably, the values are ranked according to a Figure of Merit (described in equations 1 and 2 below).

In accordance with a second embodiment of the present invention, a method for generating a modeling equation is provided comprising the steps of (a) operating an instrument so as to generate and store a spectral data set of diffuse reflectance, clear transmission, or diffuse transmission spectrum data points over a selected wavelength range, the spectral data set including spectral data for a plurality of samples; (b) generating and storing a constituent value for each of the plurality of samples, the constituent value being indicative of an amount of a target substance in its corresponding sample (c) dividing the spectral data set into a calibration sub-set and a validation sub-set; (d) transforming the spectral data in the calibration sub-set and the validation sub-set by applying a plurality of a first mathematical functions to the calibration sub-set and the validation sub-set to obtain a plurality of transformed validation data sub-sets and a plurality of transformed calibration data sub-sets; (e) resolving each transformed calibration data sub-set in step (d) by at least one of a second mathematical function to generate a plurality of modeling equations; (f) generating a Figure of Merit ("FOM") for each modeling equation using using the transformed validation data set of step (d); and (g) ranking the modeling equations according to the respective FOMs, wherein the FOM is defined as $$FOM \text{ (without Bias) } FOM=\sqrt{(SEE^{2}+2*SEP^{2})/3} \quad (1)$$

$$FOM \text{ (with Bias) } FOM=\sqrt{(SEE^{2}+2*SEP^{2}+W*_{b^{2}y}(3+w))} \quad (2)$$

where SEE is the Standard Error of Estimate from the calculations on the calibration data, SEP is the Standard Error of Estimate from the calculations on the validation data, b is the bias of the validation data (bias being the mean difference between the predicted values and corresponding constituent values for the constituent) and W is a weighting factor for the bias.

In accordance with a third embodiment of the present invention, a computer executable process, operative to control a computer, stored on a computer readable medium, is provided for determining qualitative spectroscopic analysis of a set of data on a computer readable medium, the set of data including, for each of a plurality of samples, corresponding spectral data and a corresponding constituent value, the process comprising the steps of: dividing the spectral data into a calibration sub-set of spectral data and a validation sub-set of spectral data; applying a plurality of data transforms to the spectral data in the validation sub-set and the calibration sub-set, preferably singularly and two-at-a-time as described above; applying one or more of a partial least squares, a principal component regression, a neural net, or a multiple linear regression analysis on the transformed and untransformed data sets of the spectral data in the calibration sub-set to obtain a plurality of modeling equations; applying the spectral data in the validation sub-set to each of the plurality of modeling equations to obtain corresponding values; and processing the values in order to select a best modeling equation for analyzing the spectral data. Preferably, the values are processed according to a Figure of Merit (described in equations 1 and 2 above), and the modeling equations are ranked according to the calculated FOM value, with the modeling equation with the lowest FOM value being designated as the best modeling equation.

In other aspects of the above embodiments of the present invention the modeling equation are ranked: (1) as a function of the standard error of estimate (SEP) of the validation data; (2) as a function of the standard error of estimate (SEE) of the calibration data and the standard error of estimate (SEP) of the validation data; or (3) as a function of a weighted average of standard error of estimate (SEE) of the calibration data and the standard error of estimate (SEP) of the validation data.

In accordance with another aspect of the embodiments described above, the instrument which generates the spectral data is one of a spectrophotometer, a spectral detector receptive of spectra from the spectrophotometer, a data station receptive of transmittance spectra from the detector, and, most preferably, a near infrared diffuse reflectance detector.

In accordance with another aspect of the embodiments described above, the wavelengths of the spectral data in the calibration and validation sets is between 0.7 to 2.5 $\mu$m.

In accordance with yet another aspect of the embodiments described above, the spectral data set is generated from a natural product sample, a process development sample, or a raw material sample or samples generated by biological processes including for example blood samples used in predicting clinical chemistry parameters such as blood glucose.

BRIEF DESCRIPTION OF THE DRAWINGS

FIG. 15 is an example of a data file in ASCII format.

FIG. 16 A–B are tables of transform pairs used when data is collected by diffuse reflectance, wherein FIG. 16A depicts the first transform versus second transforms and FIG. 16B depicts the ratio transform pairs.

FIG. 17 A–B are tables of transform pairs used when data is collected by diffuse-transmittance, wherein FIG. 17A depicts the first transform versus second transforms and FIG. 17B depicts the ratio transform pairs.

FIG. 18 A–B are tables of transform pairs used when data is collected by clear transmittance, wherein FIG. 18A depicts the first transform versus second transforms and FIG. 18B depicts the ratio transform pairs.

DETAILED DESCRIPTION OF THE PREFERRED EMBODIMENTS

Figure 1:
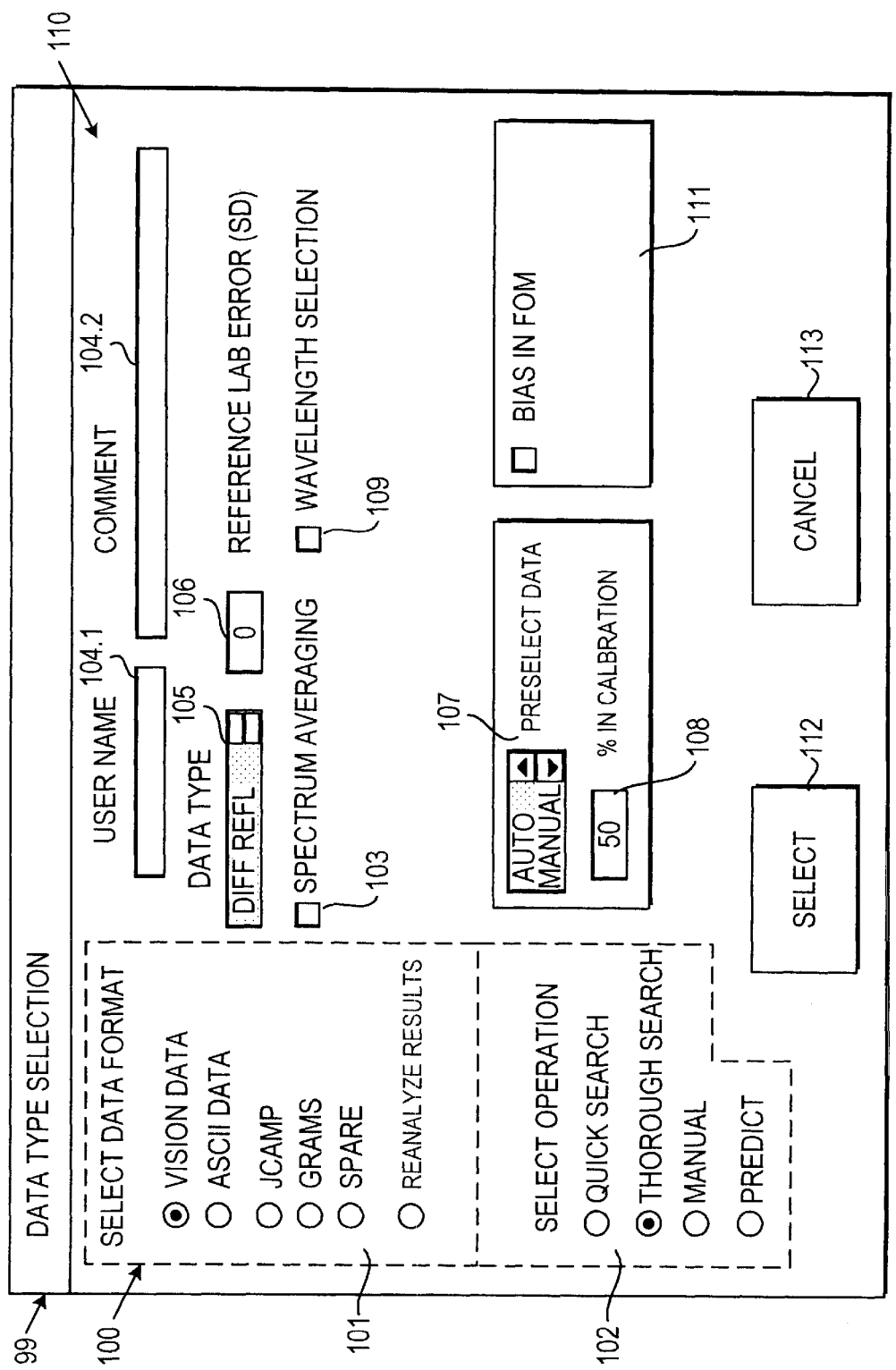
FIG. 1 is an illustration of a data selection window in accordance with a preferred embodiment of the present invention.

The preferred embodiments of the present invention will now be described in detail with reference to FIGS. 1 through 18B. Although the system and method of the present invention will be described in connection with these preferred embodiments and drawings, it is not intended to be limited to the specific form set forth herein, but on the contrary, it is intended to cover such alternatives, modifications, and equivalents, as can be reasonably included within the spirit and scope of the invention as defined by the appended claims.

For purposes of the present invention the term Gauss-Jordan is defined, as a method for selecting the most spectrally unique samples from a larger pool of samples utilizing linear algebraic techniques. (Honigs, D. E. and Hieftje, G. (1985) Unique-Sample Selection via Near-Infrared Spectral Subtraction, Anal. Chem 57, 2299–2303).

The term indicator variables is defined, for purposes of the present invention, as a variable considered in regression equations. An indicator variable (also referred to in the art as a "dummy variable") represents a non-quantifiable difference but known difference between two or more sets of samples. Draper, N. and Smith, H. APPLIED REGRESSION ANALYSIS 299–325 ($3^{rd}$ Ed., Wiley)(1998). Typical examples of indicator variables are variables used to differentiate between samples from different laboratories, or data measured by different instruments.

The term principal component analysis is defined, for purposes of the present invention, as a mathematical procedure for resolving sets of data into orthogonal components whose linear combinations approximate the original data to any desired degree of accuracy. (The Annual Book of ASTM Standards E131–98, Standard Terminology Relating to Molecular Spectroscopy, Section 3, Volume 03.06 American Society for Testing and Materials, 100 Barr Harbor Drive, West Conshohocken, Pa. 19428). As successive components are calculated, each component accounts for the maximum possible amount of residual variance in the set of data. In spectroscopy, the data are usually spectra, and the number of components is smaller than or equal to the number of variables or the number of spectra, whichever is less. The variance of a component indicates the spread of the component values around its mean value. If two components of the data are uncorrelated, their covariance is zero. The covariance matrix is, by definition, always symmetric. (Draper, N. and Smith, H. (1998) *Applied Regression Analysis* 3rd Edition, Wiley-Interscience, New York, page 120) and (Massart, D. L. et al. (1988) *Chemometrics, a textbook*, Elsevier, N.Y., page 198).

The term partial least squares is defined, for purposes of the present invention, as a multi variant modeling method used when there is essentially no error in the independent variable (x) and a normal distribution of error in the dependent variable (y). The method aims to identify the underlying factors, or linear combination of the (x) independent variables, which best model the (y) dependent variables. (Sharaf, M. A., Illman, D. L. and Kowalski, B. R. (1986) *Chemometrics*, Wiley-Interscience, New York, pages 281–292.

The term classical least squares (often abbreviated CLS, and sometimes called The K-matrix Algorithm) is defined, for purposes of the present invention as an algorithm that uses the spectra of the pure constituents in the sample to model the spectra of the calibration set of samples.

The term neural network is defined, for purposes of the present invention, as a mathematical construct which is conceptually divided into layers. Most commonly, three layers are used; these are the input layer, the middle (or hidden) layer and the output layer. The input layer contains the spectra. The output layer represents the answer(s). Each member (called a "node") of every layer except the first computes a weighted sum of the contributions of every member of the preceding layer; every member of each layer except the last contributes to every member of the next layer. After computing the weighted sum of the inputs, each node multiplies that by a non-linear function (called the "transfer function"), a common transfer function is:

$$1/(1+\exp(-x))$$

where exp(-x) represents the exponential function x an empirically determined exponent Thus the output of each node, that is passed on to all nodes in the next layer, is equal to the transfer function times the weighted sum of the inputs. The neural network is optimized by empirically changing the weighting factors in the weighted sums, to minimize the errors between the values as computed by the algorithm and the constituent values. The computation of the errors, and the statistic used to report them, is disconnected from the operation of the network itself. (Lippmann, R. P. (April 1987) An introduction to computing with neural nets, IEEE ASSP Magazine 42):4–22; McClelland, J. L., Rumelhart, D. E. (1989) *Explorations in parallel distributed processing: A handbook of models, programs, exercises*, MIT Press)

The term Figure of Merit (FOM), which is used to determine the best modeling equation, is defined, for the purposes of the present invention, as:
Without Bias $$FOM=\sqrt{(SEE^{2+2*SEP^2})/3}$$

With Bias $$FOM=\sqrt{(SEE^{2+2*SEP^{2+W*}b2})/(3+W)}$$

where:
SEE is the Standard Error of Estimate from the calculations on the calibration data (as defined above)
SEP is the Standard Error of Estimate from the calculations on the validation data (as defined above)

b is the bias of the validation data (bias being the mean difference between the predicted values and corresponding reference laboratory error for the constituent)
W is the weighting factor for the bias The term covariance is defined, for the purposes of the present invention, as a measure of the tendency of two features to vary together. Where the variance is the average of the squared deviation of a feature from its mean, the covariance is the average of the products of the deviations of the feature values from their means. The covariance properties include:

if both features increase together, covariance>0
if one feature increases while the other feature decreases, covariance<0
if the features are independent of one another, covariance=0

The covariance is a number that measures the dependence between two features. The covariance between features is graphed as data clusters.

The term NULL transform is defined, for the purposes of the present invention as making no change to the data as originally collected.

The term ABS2REFL transform is defined, for purposes of the present invention as converting absorbency to reflectance if the data was originally measured by reflectance, or converting absorbency to transmittance, if the data was originally measured by transmission (the mathematical operation being the same in either case).

The term NORMALIZ transform is defined, for purposes of the present invention as a normalization transform normalization). In accordance with this transform, the mean of each spectrum is subtracted from each wavelength's value for that spectrum, then each wavelength's value is divided by the standard deviation of the entire spectrum. The result is that each transformed spectrum has a mean of zero and a standard deviation of unity.

The term BASECORR is defined, for purposes of the present invention as performing a baseline correction. The baseline correction shifts the background level of a measurable quantity used for comparison with values representing a response to experimental intervention.

The term FIRSTDRV transform is defined, for purposes of the present invention as performing a first derivative in the following manner. An approximation to the first derivative of the spectrum is calculated by taking the first difference between data at nearby wavelengths. A spacing parameter, together with the actual wavelength spacing in the data file controls how far apart the wavelengths used for this calculation are. Examples of spacing parameters include but are not limited to the values 1, 2, 4, 6, 9, 12, 15, 18, 21, and 25. A spacing value of 1 (unity) causes adjacent wavelengths to be used for the calculation. The resulting value of the derivative is assumed to correspond to a wavelength halfway between the two wavelengths used in the computation. Since derivatives of wavelengths too near the ends of the spectrum cannot be computed, the spectrum is truncated to eliminate those wavelengths. If, as a result of wavelength editing or a prior data transform there is insufficient data in a given range to compute the derivative, then that range is eliminated from the output data. Preferably, the value of the spacing parameter is varied such that a FIRSTDRV transform includes a plurality of transforms, each having a different spacing parameter value.

The term SECNDDRV transform is defined, for purposes of the present invention as performing a second derivative by taking the second difference (i.e. the difference between data at nearby wavelengths of the FIRSTDRV) as an approximation to the second derivative. The spacing parameters, truncation, and other considerations described above with regard to the FIRSTDRV apply equally to the SECNDDRV. The second derivative preferably includes variable spacing parameters.

The term MULTSCAT transform is defined, for purposes of the present invention as Multiplicative Scatter Correction. In accordance with this transform, spectra are rotated relative to each other by the effect of particle size on scattering. This is achieved for the spectrum of the i'th sample by fitting using a least squares equation $$Y_{iw} = a_i + b_i m_w, w = 1, \ldots,$$

where $y_{iw}$ is the log 1/R value or a transform of the log (1/R) value for the i'th sample at the w'th of p wavelengths and $m_w$ is the mean log 1/R value at wavelength w for all samples in the calibration set. If Multiplicative Scatter Correction (MSC) is applied to the spectra in the calibration set then it must also be applied to future samples before using their spectral data in the modeling equation. It is the mean spectrum for the calibration set that continues to provide the standard to which spectra are fitted. The MSC may be applied to correction for log 1/R spectra or Kubelka-Munk data for example. Osborne, B. G., Fearn, T. and Hindle, P. H., PRACTICAL NIR SPECTROSCOPY, WITH APPLICATIONS IN FOOD AND BEVERAGE ANALYSIS, ($2^{nd}$ edition, Longman Scientific and Technical) (1993).

The term SMOOTHNG transform (smoothing) is defined, for purposes of the present invention as a transform which averages together the spectral data at several contiguous wavelengths in order to reduce the noise content of the spectra. A smoothing parameter specifies how many data points in the spectra are averaged together. Examples of values for smoothing parameters include but are not limited to values of 2, 4, 8, 16, and 32. A smoothing value of 2 causes two adjacent wavelengths to be averaged together and the resulting value of the smoothed data is assumed to correspond to a wavelength halfway between the two end wavelengths used in the computation. Since wavelengths too near the ends of the spectrum cannot be computed, the spectrum is truncated to eliminate those wavelengths. If, as a result of wavelength editing or a prior data transform there is insufficient data in a given range to compute the smoothed value, then that range is eliminated from the output data. Preferably, the smoothing parameter value is varied such that a smoothing transform includes a plurality of smoothing transforms, each having a different smoothing parameter.

The term KUBLMUNK transform is defined, for purposes of the present invention as a Kubelka-Munk transform. The Kubelka-Munk transform specifies a transform of the data corresponding to a theoretical study of the behavior of light in scattering samples, which specifies how the reflected light should vary as the composition of the samples vary. The equation describing this behavior is: $f(R) = (1-R)^2/2R$. Thus, the transform is a two-step procedure: first the absorbency (log (1/R)) data is transformed to reflectance, then the reflectance is transformed to the Kubelka-Munk function. The Kubelka-Munk equation specifies that the absolute reflectance should be used, however the absolute reflectance is difficult to obtain. A more commonly used method uses the calculated reflectance of the sample ($R_o$). The calculated reflectance is obtained by measuring a diffuse reflector with high reflectance (as close to 100% reflectance as can be attained) and using this measurement to represent the radiation illuminating the sample. A more accurate value for the reflectance of the sample (providing a better calibration model) is obtained by using the actual reflectance of the reference standard. The value for reflectance can be set to unity, a known value other than unity, or if unknown, the value may be entered as an automatic variable value (similar to the smoothing and spacing parameters for the smoothing transform and derivative transform).

The term RATIO transform is defined, for purposes of the present invention as a transform which divides a numerator by a denominator. The data to be used for numerator and denominator are separately and independently transformed. Neither numerator or denominator may itself be a ratio transform, but any other transform is permitted.

The term MEANCNTR transform is defined, for the purposes of the present invention as a transform which calculates the mean of all the spectra in the data set computed, wavelength by wavelength. Then the difference of each individual spectrum from the mean spectrum is computed.

The terms SGDERIV1 and SGDERIV2 transforms are defined, for the purposes of the present invention as transforms for smoothing fluctuations in the data using first derivative or second derivative respectively as described by the Savitsky-Golay method. Any order derivative is smoothed by applying a coefficient to the function. For example, a first derivative would have a coefficient value of 1, a second derivation would have a coefficient value of 2, and so on. Savitzky, Abraham and Golay, Marcel J. E., *Smoothing and Differentiation of Data by Simplified Least Squares Procedures*, Anal Chem, 36:8, 1627–1640 (1964). These transforms preferably use variable spacing parameters in the same manner as described above for FIRSTDRV and SECNDDRV.

The term Mahal Dist is defined, for purposes of this invention as the Mahalanobis distance:

$$D^2 = (X - \text{mean} X)'M(X - \text{mean} X)$$

where X is a multi-dimensional vector describing the value of the spectral data of a given sample at several wavelengths, mean X is a multidimensional vector describing the mean value, at each of the wavelengths, of all of the samples in the calibration data set (the group mean), (X−mean X)' is the transpose of the matrix (X−mean X), M is a matrix describing the distance measures in space, and $D^2$ is the square of the Mahalanobis distance between the given sample and the group mean of calibration data set. Mark, Howard *Normalized Distances for Qualitative Near-Infrared Reflectance Analysis*, Anal Chem 58, 379 (1986); Mark, Howard L., *Qualitative Near-Infrared Reflectance analysis Using Mahalanobis Distances*, Anal Chem 57, 1449 (1985).

Although it will be recognized by those skilled in the art that the concepts of the present invention can be used in other types of analytical instruments, the description herein is presented in conjunction with an infrared spectrophotometer.

A preferred embodiment of the present invention will now be discussed with respect to FIGS. 1 through 18B.

The system (and method) in accordance with the preferred embodiment described below is implemented as a software package which runs under a Desktop interpreter and uses the Chemometric Toolbox (Applied Chemometrics, 77 Beach Street, Sharon, Mass. 02067). The system allows a user to create and search through a large variety of data, to automatically perform multiple transforms on the data, and to automatically select the data giving the best results based on predetermined criteria. A manual mode is also available, which provides the operator with a method of quickly searching a large amount of data.

The data may be selected from, but is not limited to, samples generated by agricultural processes including wheat data from a variety of wheat crops, process development samples including scale-up samples, raw materials samples or samples generated by biological processes including blood samples used in predicting clinical chemistry parameters (e.g. blood glucose levels).

Selection of Data-Type and Primary Processing Parameters

In the preferred embodiment of the present invention, the program is started from the main Desktop command window by typing an appropriate command such as "ANALYZE". The "Data type Selection" window 99 will appear as shown in FIG. 1. This window is divided roughly into two sets of functions: a set of primary functions 100 and a set of data type selections 110. The primary functions 100 allow the operator to choose the fundamental type of operation: automatic or manual search. The data type selections 110 allow the operator to specify options to be used and operations to be performed during the automatic search. Except for "User Name", these options are ignored if Manual operation is selected.

The set of selections 100 is sub-divided into a set of data format selections 101 and a set of operation selections 102.

In the illustrated embodiment, the user may select from the following data formats: Vision data format, ASCII data format, JCAMP data format, GRAMS data format and NSAS binary file output format. This selection allows the operator to specify the format corresponding to the file containing the data to be analyzed. Also included in the data format selections 101 is a "Reanalyze results" option, which allows the user to reanalyze previously processed spectral data. This option will be described in more detail below. Preferably, no default entry is provided, and if neither a data format nor "Reanalyze results" is selected, the program displays an error message and exits.

The Vision data format refers to the data format used by the VISION program package, provided by FOSS/NIRSystems (FOSS/NIRSystems, Inc. 12101 Tech Road, Silver Spring, Md. 20904). The VISION program has the capability of saving data in an ASCII file of a specified format with a .TXT file extension. Selecting the VISION data format from data format selection 101 causes the system package to accept, input and convert Vision format data files into the Desktop internal data structures that are compatible with the program package.

JCAMP-DX is a public-domain standard data format created to ease the problem of transferring spectral information between otherwise incompatible data representations. The official specification for this standard format has been published (Applied Spectroscopy, 42(1), p.151 (1988)) and is provided as an auxiliary data format by many instrument manufacturers.

GRAMS is a widely used software program provided by Galactic Industries (Galatic Industries, Corp., 395 Main Street, Salem, N.H. 03079). Among its features is a set of data converters that allow it to import many different proprietary data formats from instrument vendors, and even from other software programs. The data format for GRAMs is binary in nature. Files in this format carry the .SPC extension. It should be noted that files with the .SPC extension contain only spectral data. Constituent information about the samples in the file, which are needed to perform calibration calculations, are contained in an auxiliary file having the same name, with a .CFL extension. Both files must be present in the same directory in order for the system to perform calibration calculations using this format.

NSAS binary file output format uses two files, one for the spectral data and one to contain the constituent information. These files have the same file name, the file containing the spectral data has the extension .DA and the file containing the constituent values has the extension .CN.

ASCII format refers to a special simplified format for presenting data which may be selected for use with the preferred embodiment of the present invention. The format is defined as follows. A file containing ASCII data must contain only valid ASCII characters and is row-oriented, in that each row of the file contains a set of related information. Each row must be terminated with a carriage return/linefeed pair of characters. There should be no blank rows in the file. There are two header rows, followed by rows containing the data. The first header row contains five numerical values: nspec numwave numconst firstwl lastwl, where "nspec" is the number of spectra contained in the file; "numwave" is the number of wavelengths representing each spectrum; "numconst" is the number of constituents associated with each spectrum; "firstwl" is the wavelength corresponding to the first spectral value in each data row; and "lastwl" is the wavelength corresponding to the last spectral value in each data row. The second header row contains a list of the names of the constituents whose values are in the dataset. The number of names must match the value specified in the first header row. Each name must be preceded by a space, and there may be no embedded spaces in any of the names: name(1) name(2)... name(numconst). The data rows immediately follow the header rows. There is one data row for each spectrum; the number of data rows must match the value specified in the header. Each row contains three types of information: ID Spec(1)... Spec(numwave) Const(1)... Const(numconst), where:

"ID" is any ASCII identifier for the spectrum. It can not contain any embedded spaces;

"Spec" represents the spectral data values in standard floating-point format. Each row must contain "numwave" values. If any values are missing, they may be represented by a zero. Each value must be preceded by at least one space.

"Const" represents the constituent values in standard floating-point format. Each row must contain "numconst" values. If any values are missing, they may be represented by a zero. Each value must be preceded by at least one space.

FIG. 15 shows an exemplary data file in ASCII format for an exemplary wheat data set. FIG. 15 includes 31 spectra, each containing 176 readings over the wavelength range 1100 to 2500 nm, and 2 constituents whose names are "PROT1" (a first measurement of the % protein by weight of the wheat sample) and "PROT2" (a second measurement of the % protein by weight of the wheat sample). The spectral data itself has been edited to show only the first and last readings of each spectrum. As described above, a constituent value is a reference value for the target substance in the sample which is measured by an independent measurement technique. In the example of FIG. 15, two constituent values are used, which correspond to two measurements performed on the sample by the same instrument. It should be noted, however, that the multiple constituents could alternatively be measurements from different constituents (e.g., protein and moisture in wheat) or from different instruments, or different types of instruments, or different measurement techniques altogether.

The ASCII format provides a uniform format which a user can use if the data to be analyzed is not in any of the other supported formats. In this regard, the user can simply edit the data from another format to conform to the ASCII format described above.

The "Reanalyze results" button may be selected instead of a data file format. This selection reuses the results from a previous automatic search, and an error will result if this is selected without having previously subjected a data file to an automatic search. If this option is selected, the data used will be subject to any previous (original) wavelength selections, sample selections, spectrum averaging, and will use the previously specified reference laboratory error value.

The operations selections 102 include four choices: automatic quick search, automatic thorough search, manual control of model generation (which also includes a diagnostic capability) and Prediction. The Quick and Thorough Automatic search options are used to perform an automatic search through the various combinations of data transformations and algorithms to produce an optimal modeling equation.

Both the automatic quick search and the automatic thorough search perform all the transforms specified by the Data Type selection. However, the automatic quick search uses a default parameter value for transforms that require a parameter (e.g., derivative and smoothing). The use of these default values decreases the search time, but may not provide the optimum modeling equation. For this reason, the automatic quick search is preferably used when a preliminary modeling equation is desired. The automatic thorough search performs all specified transforms, using all available values of parameters.

The manual search option allows user interaction and a quick search of the data for diagnosing data set (diagnostic capability), with attendant ability of the user to guide the process of generating a modeling equation.

The prediction search option uses an existing modeling equation to predict the constituent values (i.e., the amount of the target substance in the sample) from an existing data file.

The data type selections 110 are used to set various operational parameters for the automatic search procedure and (with the exception of the user name entry) are ignored when manual operation is selected.

The user name entry 104.1 is used to identify the user of the program who generated a particular modeling equation file. This entry is copied into the header of each modeling equation file. If left blank, the user's name is replaced with the entry "<not specified>". The "user name" entry is the only entry in the data selection functions 110 that is operative for both the Automatic and Manual operation modes. The Comment field 104.2 allows the user to enter comments regarding search (for example, to identify the nature of the search). The contents of the comment field 104.2 are also copied into the header of each modeling equation file.

The data type entry 105 identifies the manner in which the data being analyzed was collected. In this regard, the method of data collection determines the transforms and transform pairs that make sense in a given situation. The set of data collection methods preferably includes:

Diffuse reflectance (abbreviated diffrefl)

Clear transmission (abbreviated cleartrn)

Diffuse transmission (abbreviated difftran)

For each data type, an appropriate set of transforms are used during the automatic search. The sets of transforms allowed are those that make physical, chemical and spectroscopic sense for the corresponding measurement mode. FIGS. 16, 17, and 18 are matrix which illustrates which combinations of data transforms are used for diffuse reflectance, clear transmission, and diffuse transmission data collection methods. In the illustrated embodiment, the set of transform combinations is the same for each of these data collection methods. The transforms illustrated in FIGS. 16, 17 and 18, which are defined above, are NULLS, BASECORR, ABS2REFL, NORMALIZ, FIRSTDRV, SECNDDRV, MULTSCAT, KUBLMUNK, SMOOTHNG, RATIO, MEANCNTR, SGDERIV1, and SGDERIV2.

The reference lab error entry 106 represents the standard deviation of the constituent values for the data. As is commonly known in the field there are standard tests specific to certain known compounds which are performed to determine sample purity. Examples of such tests include but are not limited to standard error of analysis as provided by the National Standards Laboratory or laboratory specific method error determined by experimentation (e.g. moisture analysis, determination of heavy metal content of a sample, and standard chemical analysis). As one of ordinary skill in the art will appreciate, a spectroscopic calibration cannot be expected to correlate with the constituent values any better than the constituent values correlate with a set of external and internal standards used for determining performance of these tests. Therefore, the reference laboratory error, which represents the degree to which the constituent values correlate with themselves, can be used as a criterion for selecting which modeling equations to use. If the reference laboratory error is unknown, other criteria can be used. The other criteria include but are not limited to F-test and statistical testing methods.

Prior to performing an automatic search, the data is divided into calibration and validation subsets. The preselect data entry 107 is used to select whether this division is performed automatically or manually. The default value is "automatic".

If "automatic" is selected, the % in calibration field 108 (default value 50%) determines the approximate fraction of the total number of samples to be included in the calibration subset. The percentage of samples included in the calibration subset is preferably selected to provide maximum robustness and variability and is dependent on the total number of samples analyzed. The remaining samples are included in the validation subset. The selection of which samples are included in which subset is made randomly. Therefore, on subsequent runs different samples may be in the two subsets. Samples for the set can be selected by randomly dividing the samples into subsets or by randomly assigning each sample a number between 0 and 1. The system then preferably set a cut-off value which corresponds to the % in calibration value (e.g. a cut-off value of 0.5 for % in calibration of 50%), with those samples falling below the value assigned to the calibration set, and those falling at or above the value assigned to the validation set (or vice versa). It should be noted that the decision to group values equal to the cut-off value with the set of values "above" the cut-off value is arbitrary, and that values equal to the cut-off value could alternatively be grouped with the set of values below the cut-off value. Alternatively, the desired number of spectrally unique samples for a calibration set may be selected from a large sample pool based on a Gauss-Jordan algorithm or Mahalanobis distance algorithm criterion.

The Gauss-Jordan algorithm selects for spectral nonlinearities using the sample with the largest absolute value of absorbance ("A-sample") as the sample-selection criterion. For example, to obtain a 50% calibration set from a sample set of 1000 samples using this algorithm, the A-sample, along with 499 samples with the value closest to the value of the A-sample would be selected for the calibration set.

The Mahalanobis distance algorithm selects samples having the farthest position from the center of a circumscribed ellipse in a multidimensional distance. For example, to obtain a 50% calibration set from a sample set of 1000 samples, using this algorithm, the 500 samples with the greatest Mahalanobis distance would be selected for the calibration set.

The wavelength selection box 109 is selected when the user wishes to use only certain preselected portions of the available data spectra. If a check is entered in the box, then the operator is given the opportunity to select the wavelength ranges to use at a subsequent section of the program operation.

The Spectrum averaging box 103 is checked when a user wishes to average together (wavelength by wavelength) several spectra from the same sample. This is sometimes useful, particularly if the spectra are noisy. When the "Spectrum averaging" box is checked, a window opens labeled "# of spectra to average" in which the user can indicate how many spectra in the data file are to be averaged together to create each of the actual spectra used for the calibration modeling. The following criteria should be met before utilizing the spectrum averaging function:

1. The spectra to be averaged together actually represent the same sample, even if they are measured from different aliquots of that sample.
2. Each sample has been measured the same number of times, and that number of spectra, for each sample, included in the data file.
3. All of the spectra corresponding to a given sample are contiguously present in the data file.
4. The number entered in the "# of spectra to average" window equals the number of spectra actually collected for each sample, or left at the default value of unity.

The system automatically checks that the total number of samples in the data file is an integer multiple of the number specified to be averaged together. However, as the system does not (in the illustrated embodiment) automatically check whether spectra from different samples are being averaged together, it is up to the user to ensure that these requirements are being adhered to. If the spectrum averaging function fails, the system displays an error message. If the Spectrum Averaging box is left unchecked or if the default value of 1 is left in the "# of spectra to average" box, then each spectrum in the data file is assumed to be the spectrum of a different sample.

The Bias in FOM 111 box controls the calculation of the Figure of Merit used to compare the various modeling equations. If left unchecked, the Figure of Merit is calculated from the SEE and the SEP. If box 111 is checked, then a text-input box opens up, labeled "Bias weight" and the relative weight of the bias used to determine the Figure of Merit is entered in this box. The default value is unity (1), which causes it to have the same amount of weight in determining the Figure of Merit as the SEE. The formula used is described below.

As one of skill in the art will appreciate, SEE is the standard deviation, corrected for degrees of freedom, for the residuals due to differences between actual values (which, in this context, are the constituent values) and the NIR predicted values within the calibration set (which, in this context, are the values returned by applying the spectral data in the calibration sub-set (which corresponds to the constituent values) to the modeling equation for which the FOM is being calculated). Similarly, SEP is the standard deviation for the residuals due to differences between actual values (which, in this context, are the constituent values) and the NIR predicted values outside the calibration set (which, in this context, are the values returned by applying the spectral data in the validation sub-set (which corresponds to the constituent values) to the modeling equation for which the FOM is being calculated). A general discussion of SEE and SEP can be found, for example, in D. Burrs & E. Ciurczak, *Handbook of Near Infrared Analsis* 274–275 (Marcel Decker, Inc. 1992).

Finally, the Select button 112 causes the system to proceed to the next step of program operation using the state of the options existing when the button is pressed, and the cancel button 113 clears the Desktop memory area and exits the program, returning the operator to the Desktop command window.

Automatic, Manual, and Predict Modes

A user enters one of Quick Automatic, Thorough Automatic, Manual or Predict modes by making the appropriate selection from the select operation menu 102.

Automatic Mode

Selection of automatic mode causes the system to perform an automatic search through multiple data transforms, algorithms and parameters, and to select the best modeling equation as described below.

If either (Quick or Thorough) automatic search is checked when the SELECT button 112 is pressed, the computer first displays a sequence of standard file selection windows. The first file selection menu prompts the user to select the directory and file name (assigned by the user) containing the input spectral data. When OPEN is pressed from this window, an OUTPUT FILE SELECTION window appears. The user then enters the directory and file name to receive the modeling equation and other results. The Save button is then pressed.

Figure 2:
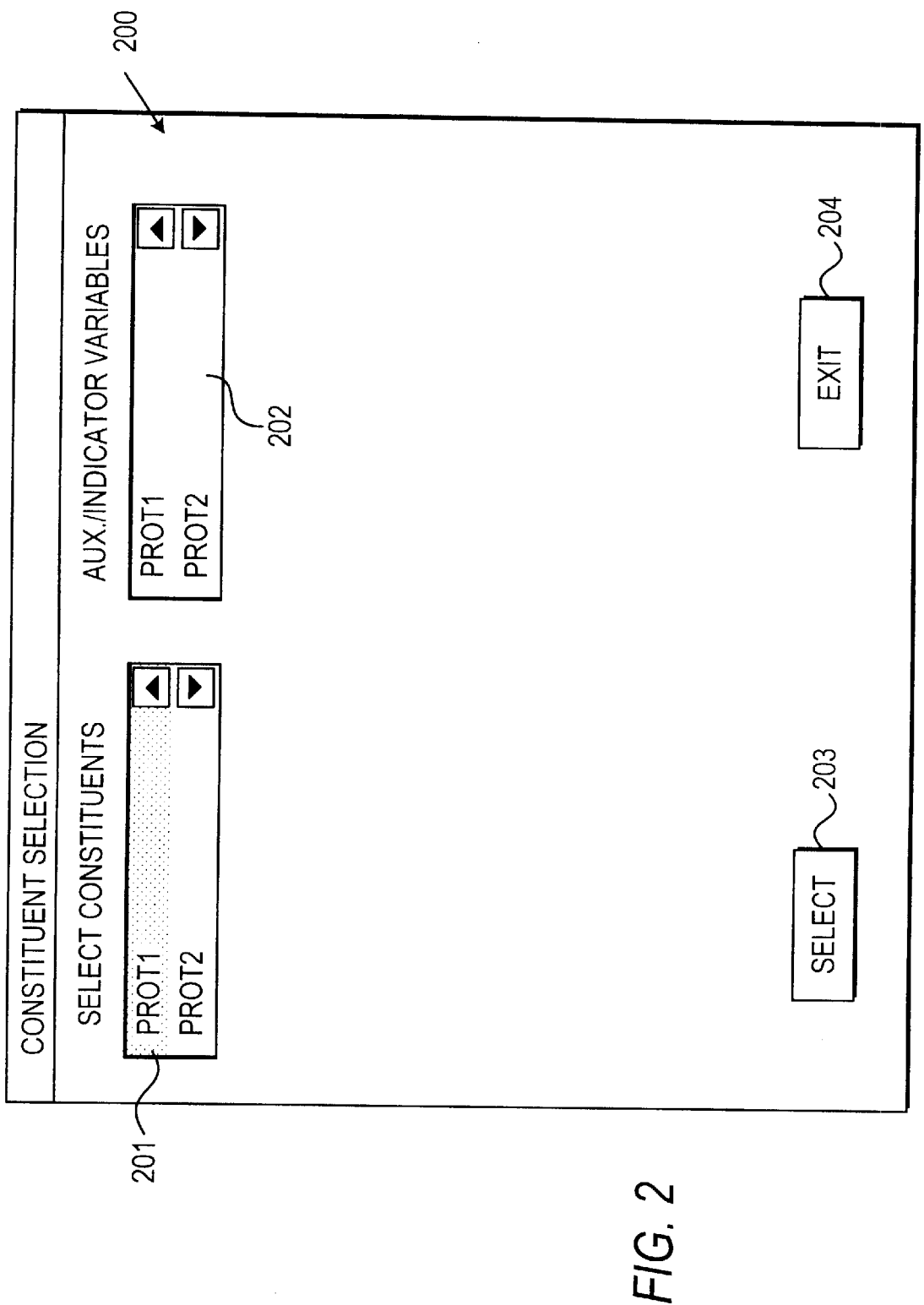
FIG. 2 is an illustration of a constituent selection window in accordance with the preferred embodiment of the invention.

A Constituent Selection window 200 will then appear as illustrated in FIG. 2. From this window, the user selects one or more constituents for calibration from the select constituents menu 201. If the data file contains more than one constituent, the constituent list will also appear in an "AUX/Indicator variables" menu 202. The user can select any of the constituents as an auxiliary or indicator variable as long as that constituent is not also selected in the select constituents menu 201. Duplication will result in an error. Contiguous sets of constituents may be selected by pressing and holding down the left-hand mouse button while running the cursor over the desired constituents. Noncontiguous sets of constituents may be selected by pressing down the CONTROL key before selecting the noncontiguous constituents.

Selection of automatic mode may also cause other input windows to appear, depending upon which options were activated from the Data type Selection window. These windows are listed below in the order in which they appear; keeping in mind that depending on the setting selected in previous windows, not all these will appear in any given program run.

Wavelength Selection

Figure 3A:
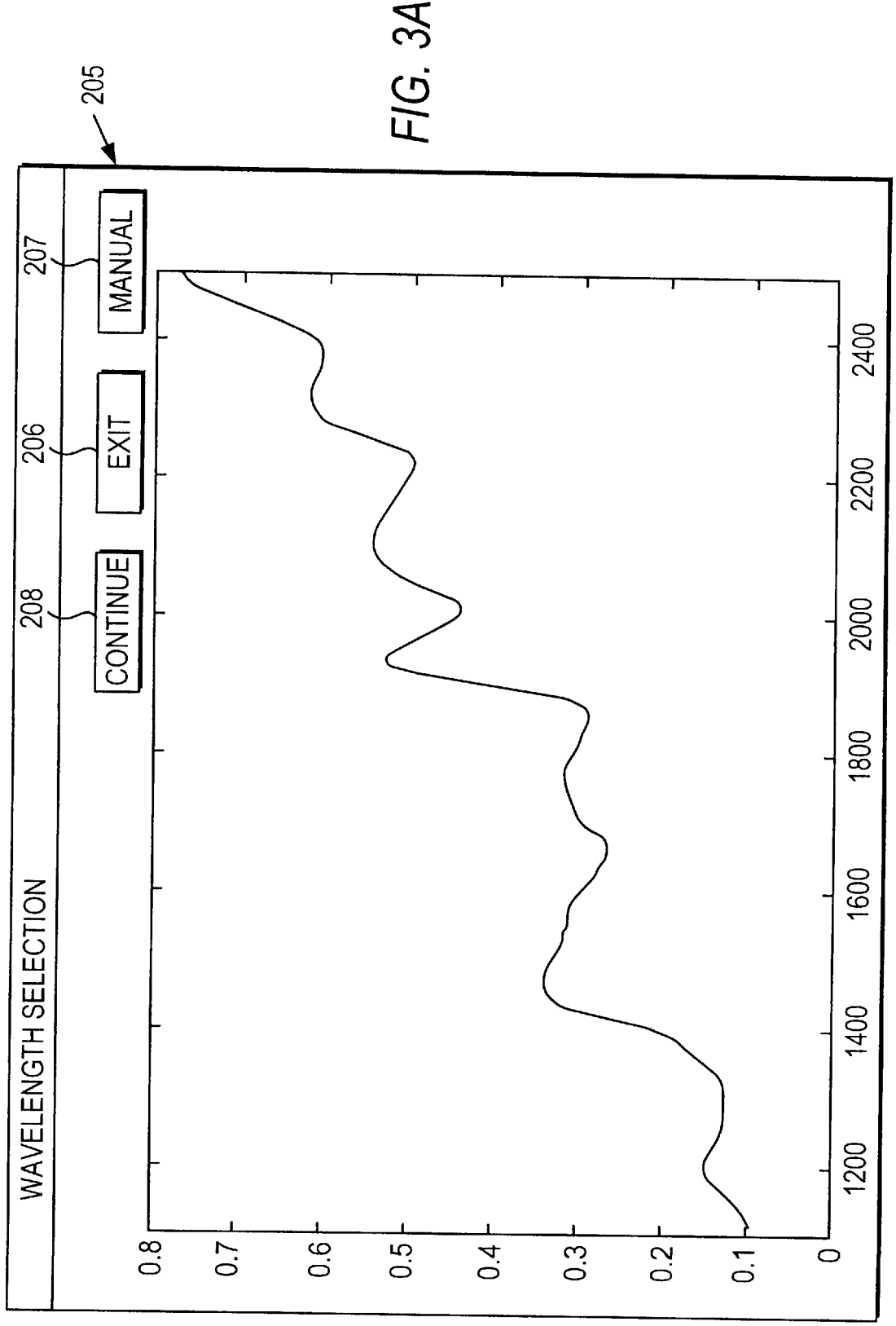
FIGS. 3 A–B are illustrations of the wavelength selection window in accordance with the preferred embodiment of the invention.

If the "Wavelength Selection" box 109 was checked on the Data type selection window 99 prior to pressing the select button 203, then the spectrum of one sample from the data file is displayed on the wavelength selection window 205 (FIGS. 3(a–b)). From this window, wavelength selection can be performed either graphically or numerically. Moreover, graphical selections and manual selections may be freely combined.

Figure 3B:
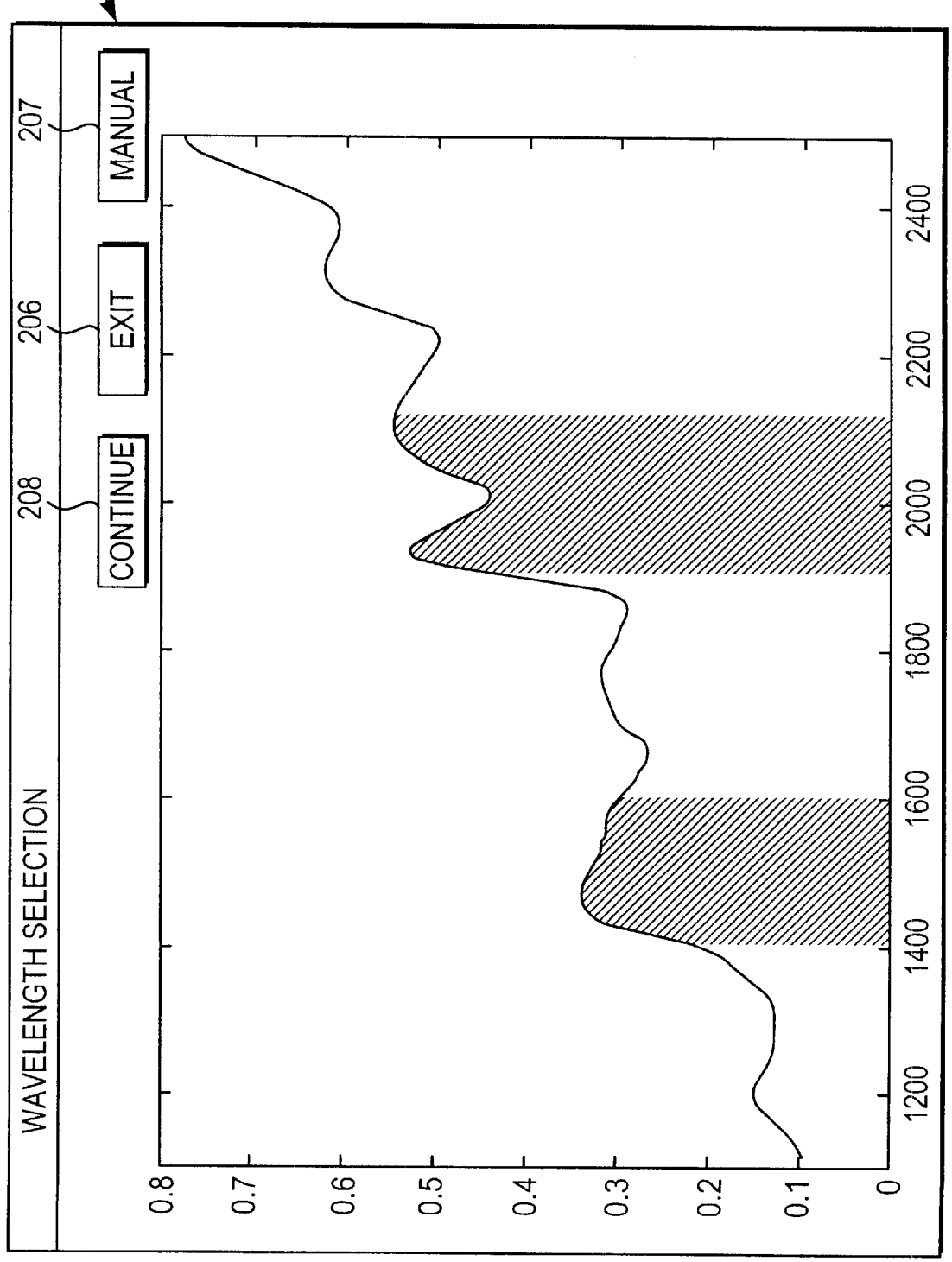

As illustrated in FIG. 3(b), one or more wavelength ranges may be graphically selected for analysis by clicking the left mouse button while the cursor is at the wavelength in the spectrum corresponding to the beginning of the desired wavelength range. As the cursor is moved over the spectrum, the selected wavelengths are indicated by having the area underneath them filled in, as shown in FIG. 3B. The left mouse button is then pressed a second time to select the end of the desired wavelength range. If multiple wavelength ranges overlap or are contiguous, they will be combined into a single wavelength range.

Figure 4:
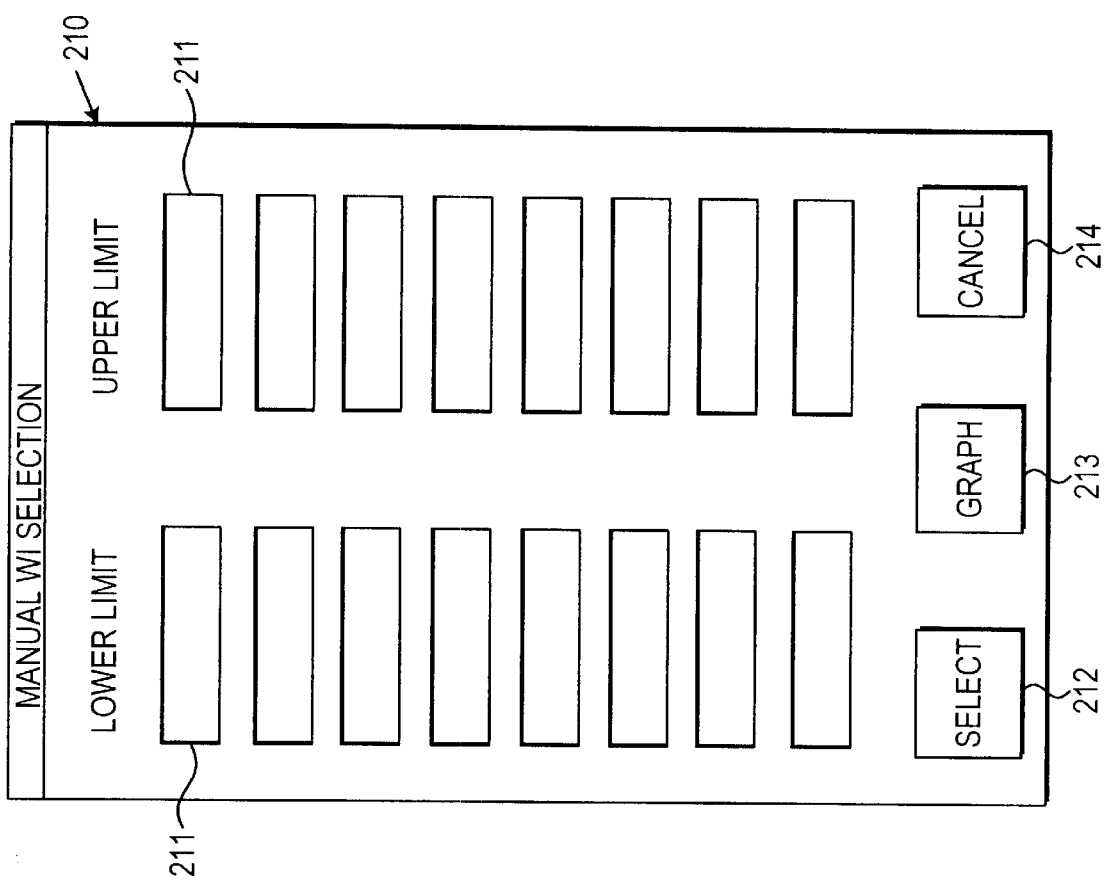
FIG. 4 is an illustration of the manual wavelength selection window in accordance with the preferred embodiment of the invention.

If the user wishes to enter the wavelength range(s) manually, he or she presses the "Manual" button 207 on the Wavelength selection window 205. This causes the manual selection window 210 to be displayed as shown in FIG. 4. From window 210, the user can manually type in numerical values for the lower and upper limits for each desired wavelength range. Referring to FIG. 4, the manual selections are entered in contiguous fields beginning with the top fields 211. In the illustrated embodiment, the manual entry window provides for entering only eight wavelength ranges. If the user desires to enter additional ranges, he or she can simply switch to the graphical entry mode and then back again to the manual mode to input the additional ranges.

Referring to FIG. 4, pressing the "Cancel" button 214 from the Manual Wavelength Selection window 210 will close that window and discard any entries made, returning operation to the graphical input mode. Pressing the "Graph" button 213 from the Manual Wavelength Selection window 210, in contrast, will return operation to the graphical wavelength selection window 205 without discarding the manual entries previously made. The manually entered wavelength range values will be retained and added to those selected graphically. Finally, pressing the "Select" button 212 from the Manual Wavelength Selection window 210 will close that window and add any numerical values entered to the list of wavelength ranges to be used in the search.

Returning to FIG. 3, pressing the "Exit" button 206 from the Wavelength Selection window 205 will abort program operation and return to the Desktop command window. Pressing the "Continue" button 208 of the wavelength selection window 205 will send the program to the next input window of the configuration procedure, or commence the automatic search if there are no additional input windows in the configuration procedure.

Manual Sample Selection

Figure 5:
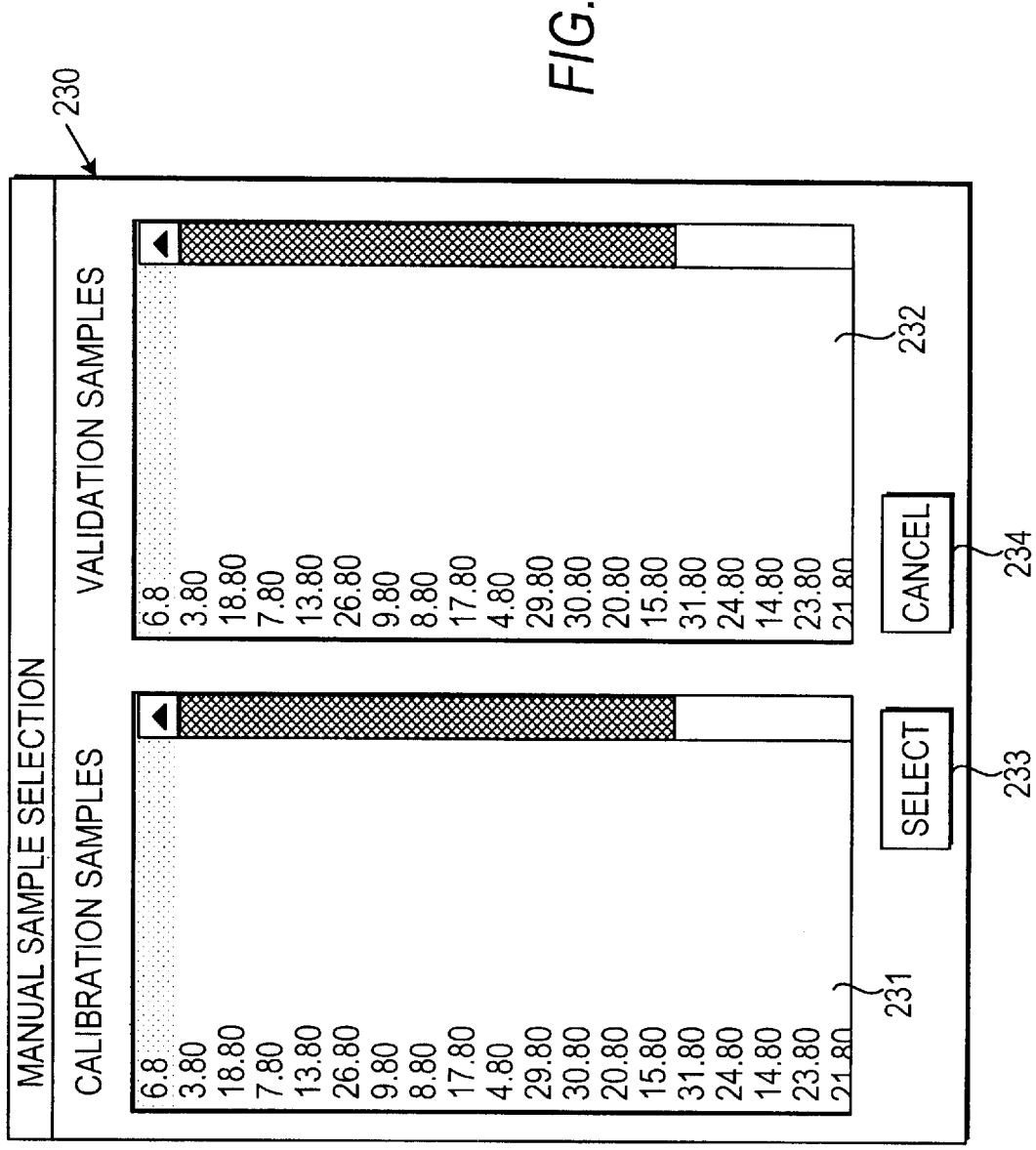
FIG. 5 is an illustration of the manual sample selection window in accordance with the preferred embodiment of the invention.

Referring to FIG. 5, the manual sample selection window 230 allows the user to select particular samples (and only those samples) to be used for the calibration and validation subsets. The corresponding sample ID for each sample in the data file is displayed in both the calibration samples box 231 and the validation samples box 232. Contiguous sets of samples may be selected for inclusion in the validation or calibration subsets by pressing and holding down the left-hand mouse button while running the cursor over the desired samples. Noncontiguous sets of samples may be selected by releasing the mouse button, moving the cursor to the desired sample ID and pressing down the CONTROL key before pressing the left mouse button again to select the noncontiguous samples. Preferably, no sample is included in both the calibration subset and the validation subset because this would be contrary to the purpose of using validation data. However, if the user so desired, one or more samples could be included in both the validation subset and the calibration subset. In addition, the user may choose to leave certain samples out of both subsets.

Pressing the Select button 233 from the window 230 continues program operation with the commencement of the automatic search, and pressing the cancel button 234 clears the Desktop memory area and exits the program, returning the operator to the Desktop command window.

The manual sample selection window 230 (if active) is the last window that the operator will observe before the program enters the automatic search functions. If window 230 is not active, the last window observed will be one of the windows 200, 205, and 210, depending on the particular selections made in the data type selection window 99 of FIG. 1.

In any event, during the automatic search, the system displays progress reports to indicate that the program is indeed active, and also to allow the operator to estimate how far along the search sequence the computer is at any given time.

Once the "Select" button on the Manual sample selection window 230, or whichever window is the last one to be presented in the sequence, the search process begins. Initially, the computer performs the sample selection, data and wavelength editing specified during the configuration process, and then begins the search process.

The data transforms determined by the specifications contained in the Data type window 99 are executed on the calibration sub-set and on the validation sub-set.

As discussed above, two successive data transforms may be applied to the data. The following is a list of 13 preferred data transforms in accordance with the invention: NULL, BASECORR, ABS2REFL, NORMALIZ, FIRSTDRV, SECNDDRV, MULTSCAT, KUBLMUNK, SMOOTHNG, RATIO, MEANCNTR, SGDERIV1, and SGDERIV2. If a RATIO transform is selected, both numerator and denominator transforms are also selected from this list (except that neither may itself be a ratio).

Not all possible combinations of transforms are performed during the automatic search. Rather, only those pairs which make chemical, spectroscopic and/or physical sense are performed. In this regard, the particular transform pairs which "make sense" in a given spectroscopic situation are selected based on the method of data collection, i.e. those pairs that make chemical spectroscopic and physical sense for Diffuse Reflectance, Clear Transmission, or Diffuse Transmission. For example, the Kubelka-Munk transform would normally be used only in conjunction with diffuse reflectance measurements. Another example is the MEANCTR transform, normally used as an early step in most calibration algorithms, it is not included in the automatic search protocol. Instead, this transform is preferably used only for visual inspection of the data during manual calibration/troubleshooting operation.

In contrast, in manual mode, under the control of the user, any pair of transforms may be performed in succession (whether they "make sense" or not). The user is warned, however, that inappropriate transforms may result in, for example, divide-by-zero errors, or other anomalous results).

In any event, as described above, the transform pairs which are preferably performed during the automatic search are described in FIGS. 16A, 17A and 18A. It should be noted that when "NULL" is selected-for both transforms, the original data is used unchanged. The format of the original data is assumed by the system to be absorbency data (i.e., log 1/T or log 1/R).

In addition, the combinations of transforms which are used for the RATIO transform are illustrated in FIGS. 16B, 17B and 18B. If a ratio transform is specified, then numerator and denominator data sets are transformed individually. The wavelength range corresponding to the denominator data set is divided into ten equal segments and the wavelength in the center of each segment is used to provide the values for the divisor. If indicator variables, are included, they are a fixed offset values which are incorporated into the calculation of the modeling equations.

Some of the transforms, particularly the smoothing transform and derivative transforms, have J &; parameters (e.g., spacing of data points for the first derivative, second derivative, Savitsky-Golay first and second derivative and smoothing transforms) associated with them. During the automatic search, for any data transform that requires a parameter, the data transform is performed multiple times, using different values of the parameter.

The smoothing transform can be used as transform #1 251, transform #2 252, or both a transform#1 and transform #2. If the smoothing transform is used for both the first and second transform then both transforms share the same value of the smoothing factor. If a first derivative or second derivative transform is used for both transforms, or if one of each type of derivative transform is used for each transform in either order, then they share the same value of the spacing parameter.

When the smoothing transform or the first derivative and second derivative are used as part of a ratio transform, either can appear in any of four places: as the numerator or denominator transform of either the first or second ratio transform. Regardless of where or how many times the smoothing transform or the derivative transform appears as part of a ratio transform, the same value of the smoothing parameter or spacing parameter (which may have the same or different values as the corresponding parameter for the first or second transform taken from the same set of available values), are used as a transform. The first derivative or second derivative can be used as transform #1, transform #2, or both a first and second transform. If the first derivative and second derivative are used for both the first or second transform, or if one of each type of derivative transform is used for each transform in either order, then the derivatives share the same value of the spacing parameter.

When the search is executed, the data is divided into calibration and validation subsets. As described above, this division may be performed automatically, with the computer randomly selecting which samples to include in each subset. Alternatively, the division of the data may be performed manually, with the operator selecting the samples to include in each subset.

All of the available algorithms are then applied to each set of transformed calibration data. Preferably, the algorithms include PLS (partial least squares), PCR (principal component regression), and MLR (multiple linear regression), thereby producing three modeling equations for each set of transformed calibration data. Additional algorithms may include artificial neural networks, selections based on Mahalanobis Distances or through use of the Gauss-Jordan algorithm.

Each of the modeling equations is then applied to the validation data sub-set. In this regard, the validation data applied to each modeling equation has been transformed in the same manner as the calibration data which generated that modeling equation.

The "best" modeling equation is selected on the basis of a "Figure of Merit", which is computed using a weighted sum of the SEE and SEP, the SEP being given twice the weight of the SEE. This Figure Of Merit (FOM) is also displayed in the manual mode, along with the SEE and SEP. The FOM is calculated using one of two equations as follows, depending on whether the "Bias in FOM" box is checked:

If "Bias in FOM" is unchecked:

$$FOM = \sqrt{(SEE^2 + 2 \cdot SEP^2)/3}$$

If "Bias in FOM" is checked:

$$FOM = \sqrt{(SEE^2 + 2 \cdot SEP^2 + W \cdot b^2)/(3+W)}$$

where:

SEE is the Standard Error of Estimate from the calculations on the calibration data SEP is the Standard Error of Estimate from the calculations on the validation data b is the bias of the validation data (bias being the mean difference between the predicted values and corresponding constituent values for the sample)

W is the weighting transform for the bias, entered in the "Bias weight" box that is displayed when the bias box 103 is checked.

In this regard, the following is an example the manner in which bias (b) is calculated for a set of 14 validation samples:

|  | Constituent Value | Predicted | Residual |
|---|---|---|---|
|  | 15.0000 | 14.3605 | 0.6395 |
|  | 15.1500 | 14.7641 | 0.3859 |
|  | 13.9500 | 13.5249 | 0.4251 |
|  | 16.6000 | 16.4351 | 0.1649 |
|  | 16.2000 | 16.2111 | −0.0111 |
|  | 16.2500 | 16.4249 | −0.1749 |
|  | 13.7000 | 14.6055 | −0.9055 |
|  | 15.4000 | 15.2679 | 0.1321 |
|  | 13.9500 | 14.4197 | −0.4697 |
|  | 12.7500 | 12.5589 | 0.1911 |
|  | 12.8000 | 12.9398 | −0.1398 |
|  | 12.1000 | 12.5427 | −0.4427 |
|  | 13.2000 | 13.7339 | −0.5339 |
|  | 12.5000 | 12.7582 | −0.2582 |
| Means | 14.2535 | 14.3248 | −0.0712 |

The bias (b) is the mean residual, −0.0712 in this case. It may be computed either as the mean of all the individual residual values, or as the difference between the means of the actual (reference) values and predicted (by the instrument/model) values.

After the transforms are performed, the parameter values and the performance statistics are all saved internally. When all calculations have been completed, the results are sorted according to the Figure of Merit (FOM), and the modeling equation corresponding to the data transform and algorithm providing the lowest value for the FOM is determined, and designated as the best modeling equation. This file is then saved as an equation file (.EQN extension) using the file name specified from the OUTPUT FILE SELECTION window described below.

In addition, the intermediate results are saved in a file having the same name as the equation file, but having a .MAT extension. This file is required to be present in the same subdirectory as the equation file if the "Reanalyze" selection of the Data Type window 99 is to be used.

Manual Mode

Manual mode may be used to manually perform a search on a formatted data file. It is also used in conjunction with the Reanalyze function on the Data type selection window 99. If a data file format is specified then the search is performed as described under "Automatic" operation, except no results are saved until a manual save is performed. If "Reanalyze" is selected, then the previously saved results from the search are reloaded and used. This saves considerable time as compared to re-running the search each time. In addition, as described below, the "manual" reanalyze function allows the user to add models to the models from the previously executed automatic search. As described previously, when Manual mode is selected, all entries in the right-hand side of the Data Type window are inactive, except User Name.

If both "Reanalyze" and "Manual" are selected on the data type selection window 99 when the select button 112 is actuated, then the computer displays the OUTPUT FILE SELECTION window. From this window, the user specifies the file to reload. The file is used for both input and output. The manual functions also allows the operator to add models to the ones resulting from the previously executed automatic search. Thus, at this point a previously created file containing the models from the automatic search is selected. The computer then reloads the file and displays a PLOT CONTROL window 240.

Figure 6:
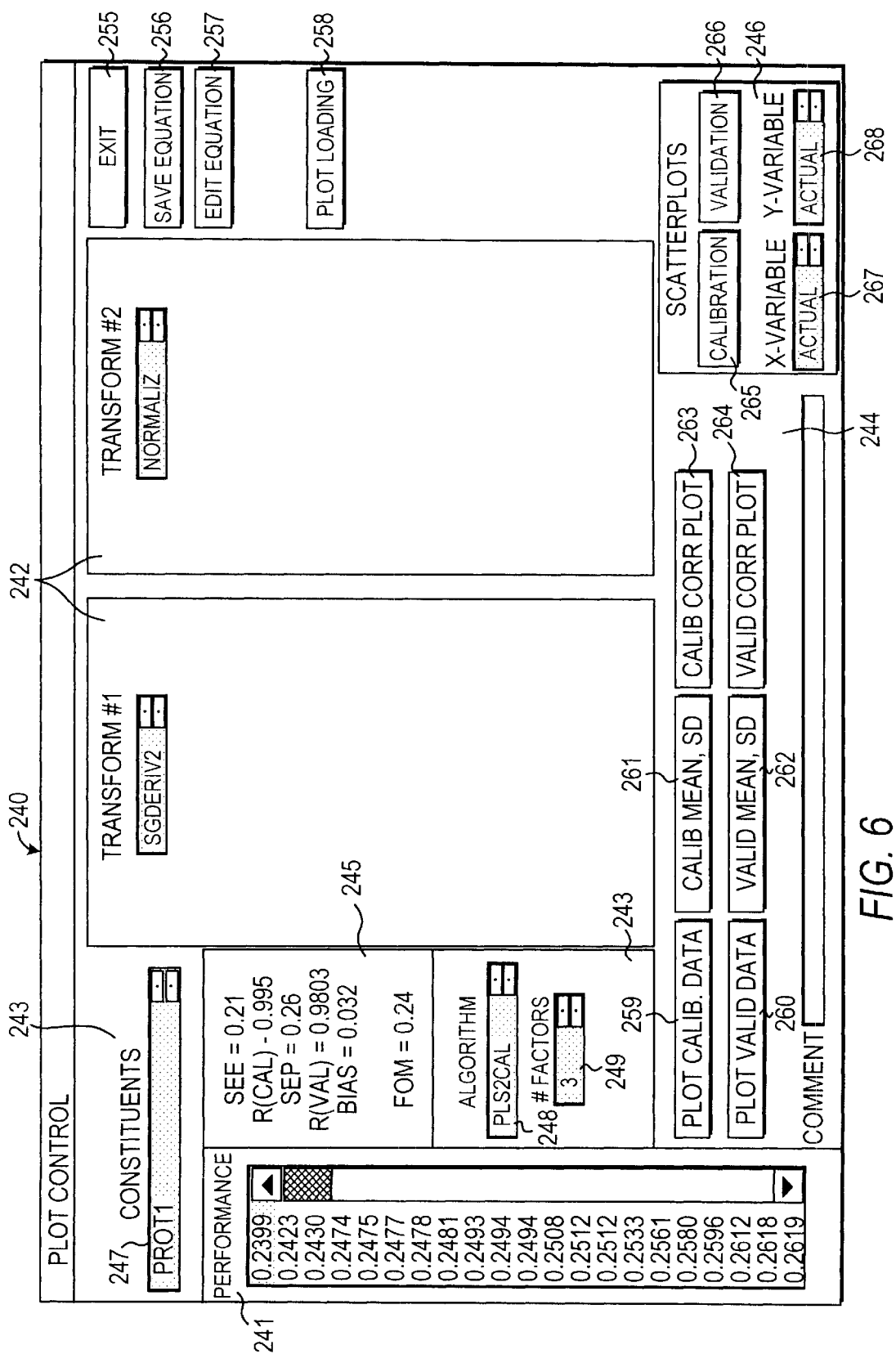
FIGS. 6 and 7 are illustrations of plot control windows in accordance with the preferred embodiment of the invention.
Figure 7:
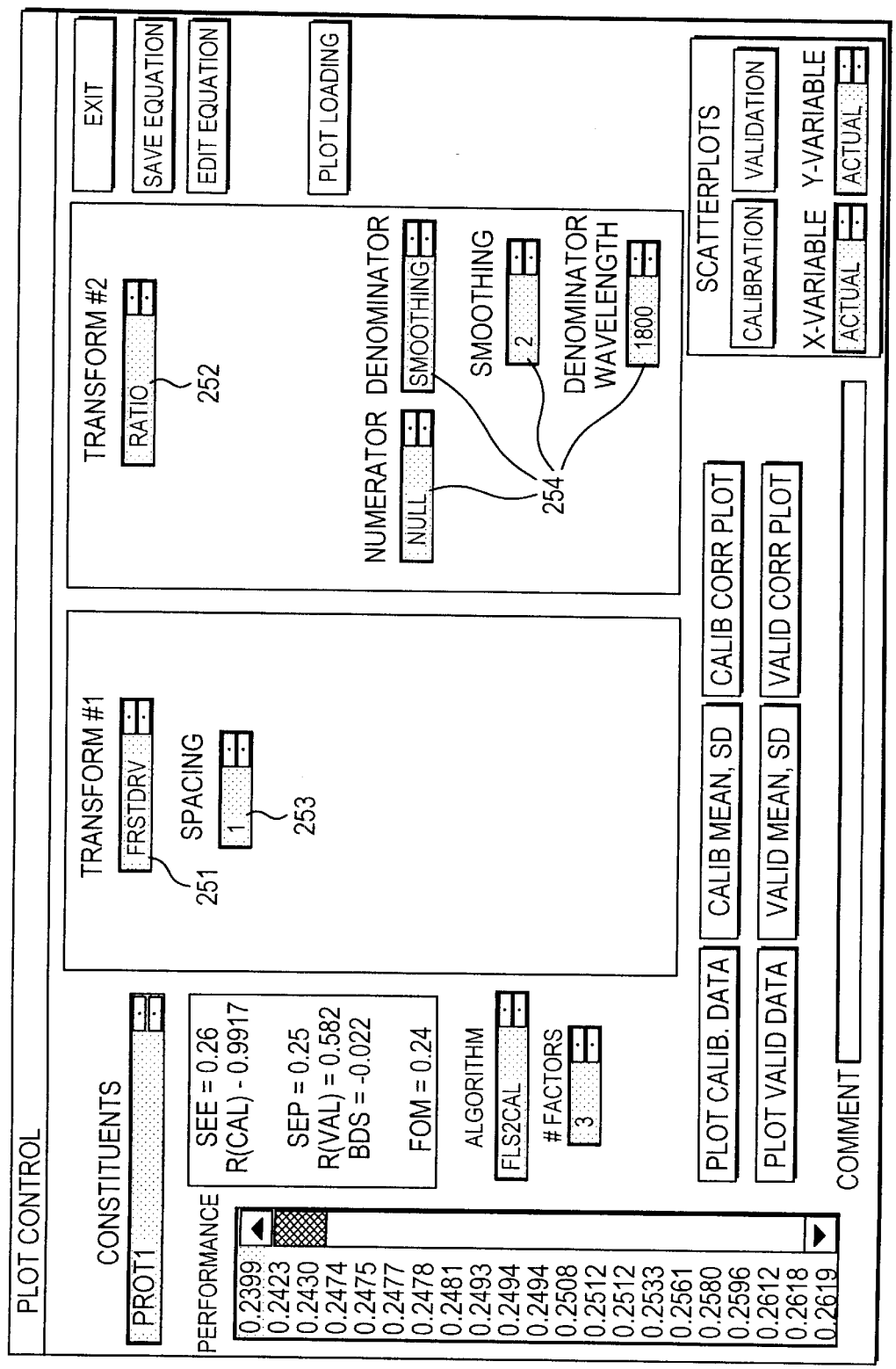

Referring to FIGS. 6 and 7, the plot control window 240 is the primary gateway to the functions and operations of Manual mode. This window is divided into five main sections: Result Window 245, Transform Control 242, Algorithm Control 243, Prior Result Control 241, Operation Control Buttons 244. Transform parameters and functions become visible as they are required. FIG. 6 shows the window with no expansion for Transform #1 or for Transform #2. FIG. 7 shows a single level of expansion for Transform #1 and maximum expansion of Transform #2.

The system, at all times, internally contains a modeling equation, which can be regarded as the current modeling equation. This modeling equation is updated as required. The Result Window 245 displays six performance statistics which correspond to the current modeling equation for the constituent that is displayed in the "Constituents" selection window 247 of the Algorithm Control section 243: the SEE for the calibration data, the Correlation Coefficient for the calibration data (R(cal)), the SEP for the validation data, the Correlation Coefficient for the validation data (R(val)), the bias of the predictions on the validation data; and the Figure of Merit. This provides a capsule summary of the performance statistics for the current modeling equation.

The transform control section 242 shows the data transform applied to the calibration and validation spectral data at the top of this section, and the current value of any required parameters are displayed below. Since this is a manual mode window, any of the transforms described above can be selected as the first or second transform. There is no requirement (as there is in the automatic search) that the transforms or combinations thereof that "make sense" for a given set of data. As illustrated in FIG. 6(a), if a transform does not require any parameters, then none are shown. Referring to FIG. 6(b), if a parameter is required for a transform, then selection box(es) are provided in the window 242 to allow the user to select or otherwise input values for the appropriate parameters. Each of the selection boxes for the parameters indicated may be scrolled through all their allowed values independently.

Whenever a new transform, or a new value for a parameter for a transform is selected, the internal current modeling equation is updated to reflect the modeling equation corresponding to the new transform, and the statistical summary presented in the Result Window is also updated to present the performance statistics corresponding to the new modeling equation.

The algorithm control section 243 is displayed as two noncontiguous sections of the window 240 which contain the following related features: Algorithm selection 248, Constituent selection 247, and the Number of Factors selection 249.

The Number of Factors selection box 249 allows the user to choose the number of factors (for PLS or PCR calibration calculations) or the number of wavelengths (for MLR calibration calculations) to use in calculating the modeling equation.

The Algorithm selection box 248 provides the user with the capability of determining which of the available algorithms are to be used to create a modeling equation from the data (as transformed according to the specifications of the Transform Control section). As discussed above, the algorithms preferably include: PLS, PCR, and MLR. Each time a new algorithm is selected, the internal modeling equation is updated according to the data transform specifications and number of factors, and the statistics displayed in the Result Window are updated accordingly.

By selecting the appropriate constituent in the Constituent selection box 247, the user can have the results for any of the constituents selected for calibration displayed in the Result Window 245. Selecting a different constituent also updates the entries in the Prior Result Control section 241.

As described above, the results from the automatic search are sorted according to the Figure of Merit, and then the modeling equation corresponding to the transform and algorithm resulting in the lowest value of the Figure of Merit is saved in the .EQN file. When entering the Manual mode of operation, the entries in the Plot Control window 240 (i.e., the default entries) are set up to correspond to this modeling equation. In other words, the data transforms 251, 253, parameter values 253, 254, algorithm 248, number of factors 249 and performance statistics 245 are set to correspond to the modeling equation saved in the EQN file of re-analyzed data.

The entire sorted list of Figures of Merit for the constituent displayed in the Constituents selection box 247 is presented in the Prior Result Control section 241. Selecting any of these FOMs causes the Transform Control section 242 and the Algorithm Control section 243 to be updated to correspond to the calculation conditions under which the selected FOM was obtained. In addition, the current modeling equation is updated to correspond to these conditions, and the performance statistics for that modeling equation displayed in the Result Window 245 (FIG. 21 A–B).

Referring to FIG. 6, the save equation button 256 is used to save the current modeling equation. As described above, the current modeling equation is the model which corresponds to the settings of the Transform Control section 242 and Algorithms Control section 243 of the plot control window 240. The modeling equation is saved in the ASCII file corresponding to the specified file name. The modeling equation is saved at the end of the file, and is added to any modeling equations already saved in that file. The Save Equation function should not be used if the file specified is open to any other program, including the Edit Equation function. The exit button 255 causes the system to return to the desktop control window.

The Edit Equation button 257 invokes the text editor and automatically loads the file containing the modeling equations selected by the operator.

Figure 8:
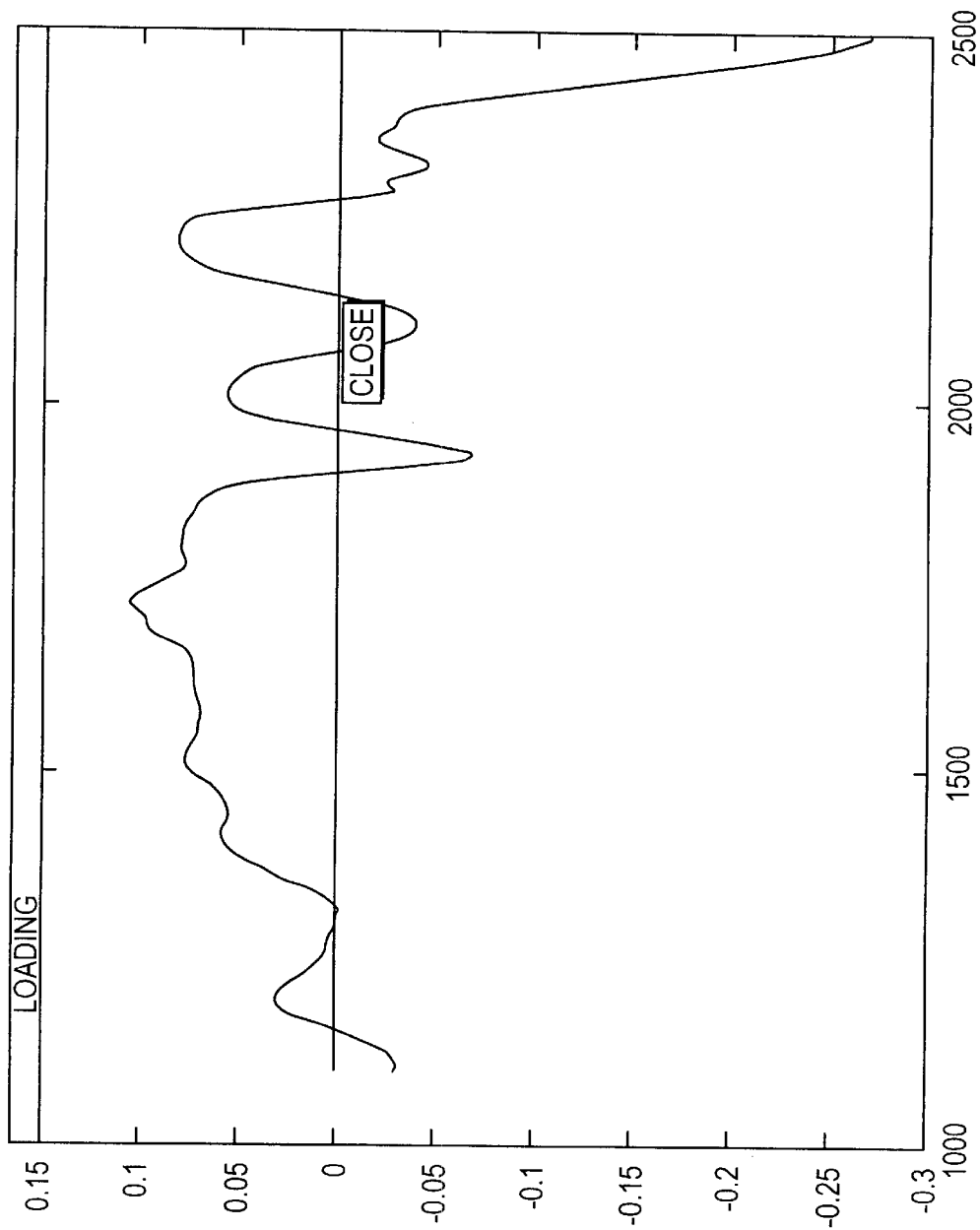
FIGS. 8 and 9 are an illustration of a loading plot for the wheat data with no transform applied.
Figure 9:
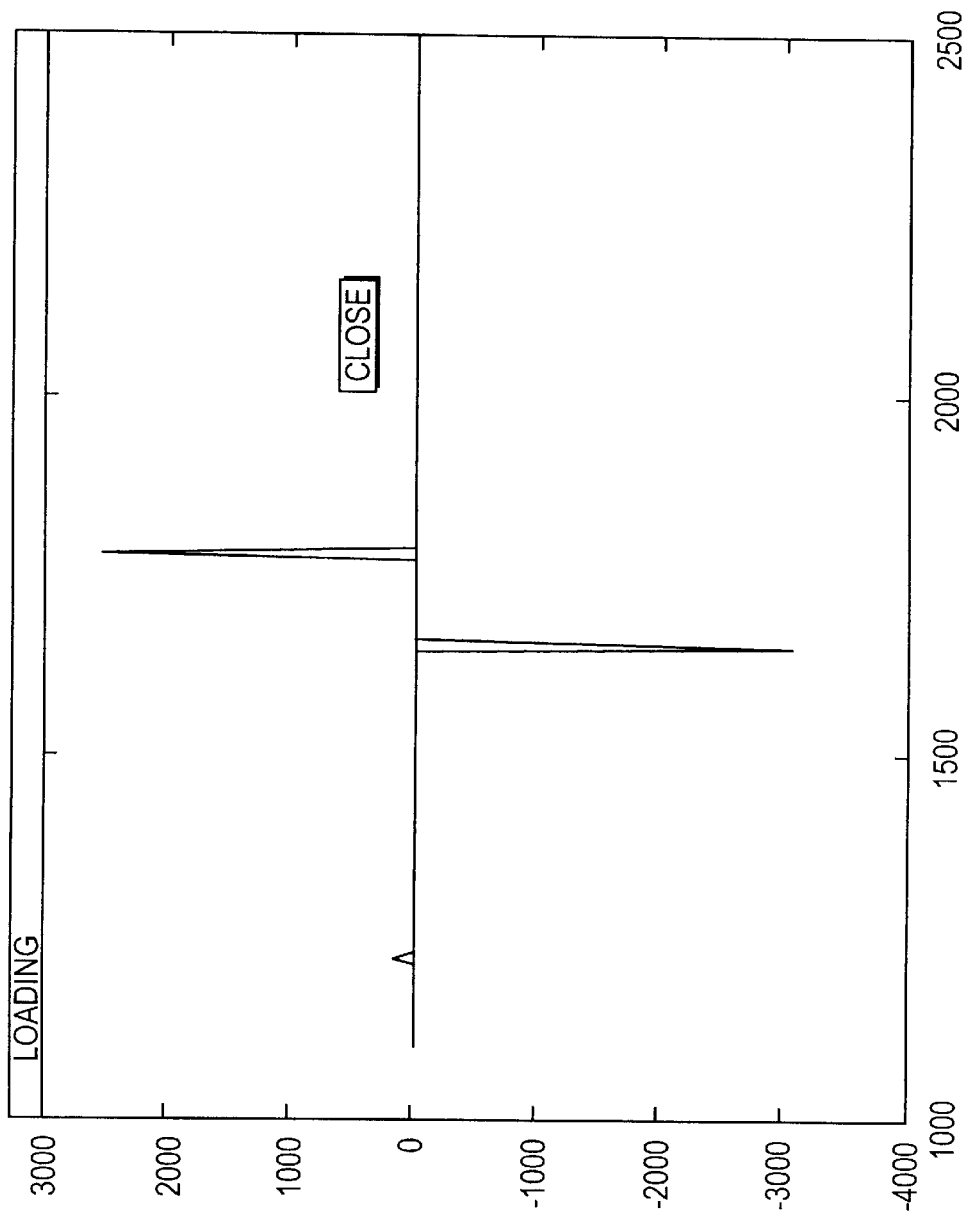

Referring to FIG. 6, the Plot loading button 258 is used to invoke a plotting function, the nature of which is dependent upon the algorithm used to create the current modeling equation. If the algorithm used was PCA or PLS, then a plot of the loading corresponding to the entry in the Number of Factors window is displayed. For example, if the Number of Factors 249 is set to a 3, then the third loading is plotted for the corresponding algorithm. If the algorithm is MLR, then the modeling equation is plotted in lieu of factors. For example, FIG. 8 shows a loading plot for untransformed wheat data from the third PCR factor, and FIG. 9 shows a plot of an MLR loading wheat data. In this regard, it should be noted that as MLR does not produce true loadings, the program plots the calibration model itself instead of a loading when the calibration algorithm is MLR. In either case, clicking on the "Close" button returns operation to the Plot Control window.

Selecting the Plot calib. data button 259 from FIG. 6 causes the system to plot all the spectra in the calibration data set. In this regard, the plotted calibration data is transformed according to the specifications set forth in the Transform Control section 242. An exemplary plot is presented in FIG. 10, wherein the calibration data is transformed to a first derivative. When the cursor is placed near the plot of any spectrum, the sample ID for that spectrum is displayed in a text box. When multiple spectra are displayed on a single plot, the ID for the spectrum nearest the cursor is displayed.

Similarly, selecting the Plot valid data button from FIG. 6 causes the system to plot all the spectra in the validation data set, transformed according to the specifications set forth in the Transform Control section 242.

Figure 11:
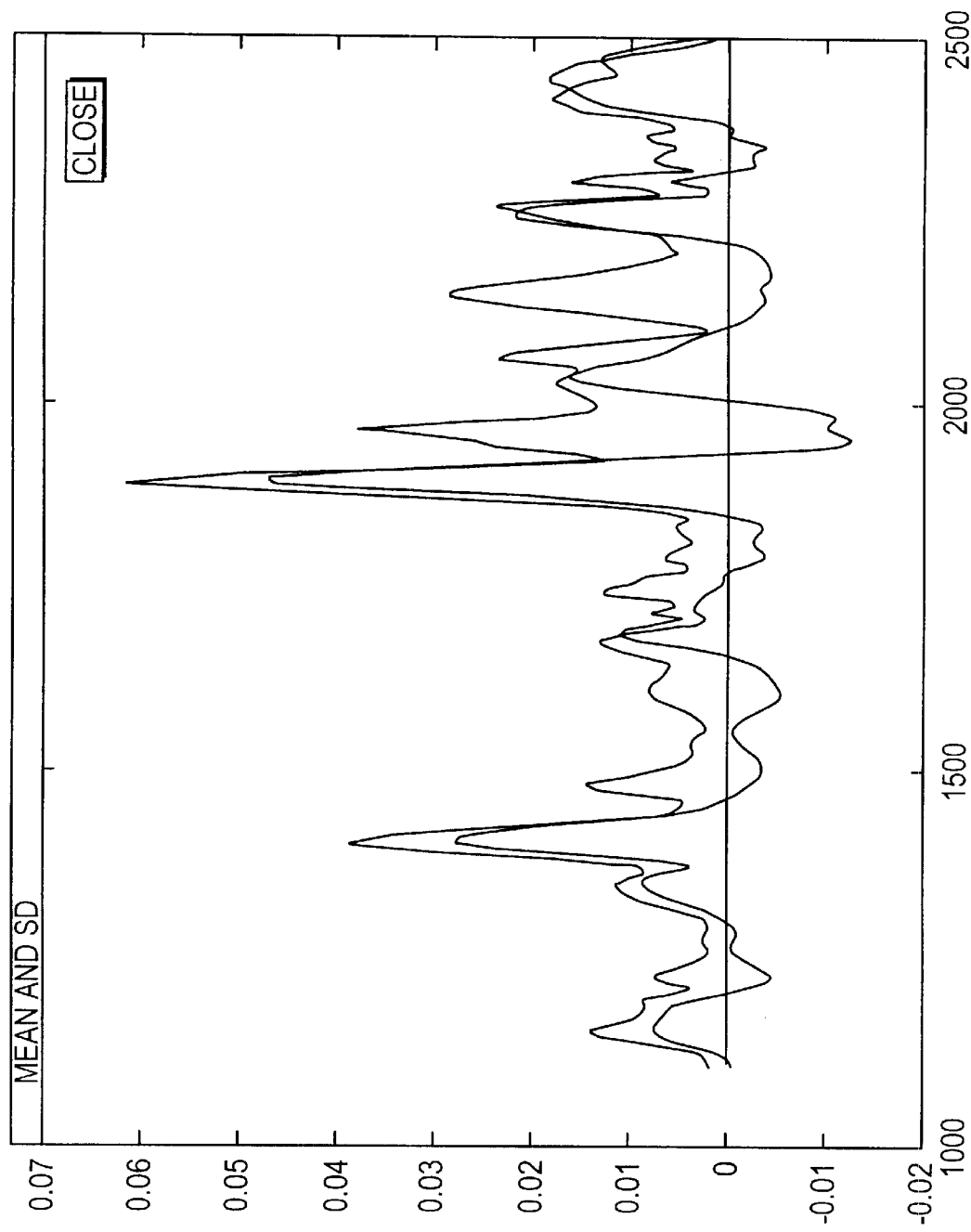
FIG. 11 is an illustration of the mean and standard deviation of wheat data transformed to first derivative.

Selecting the Calib mean, SD button 261 (or the Valid mean, SD button 262) causes the system to plot the mean and standard deviation of the calibration/validation spectral data after the data has been transformed according to the specifications in the data transform section 242 of the Plot Control window 240. FIG. 11 shows an illustrative plot from the test wheat data set of FIG. 15 with a first derivative transform applied.

Figure 12:
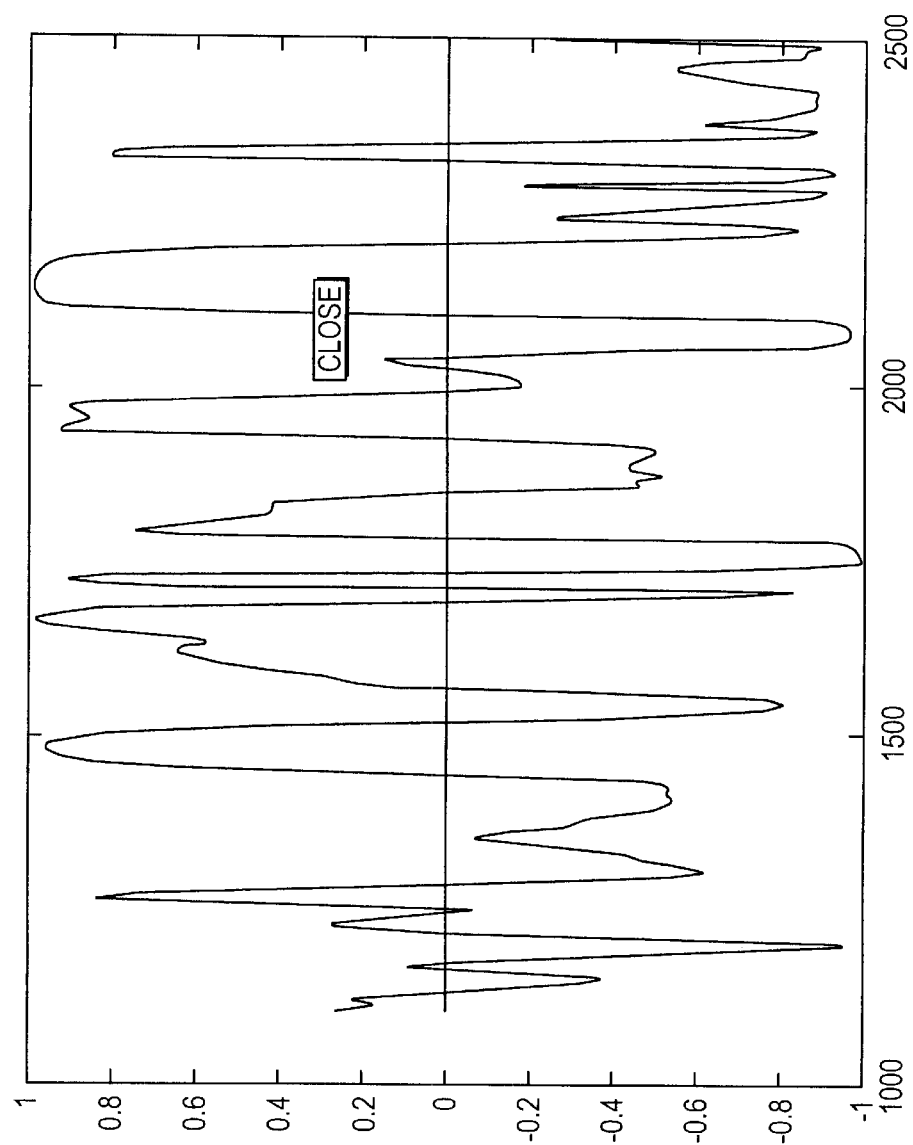
FIG. 12 is an illustration of a correlation plot of the spectral data taken from the test wheat data, transformed to a first derivative, against protein values.
Figure 13:
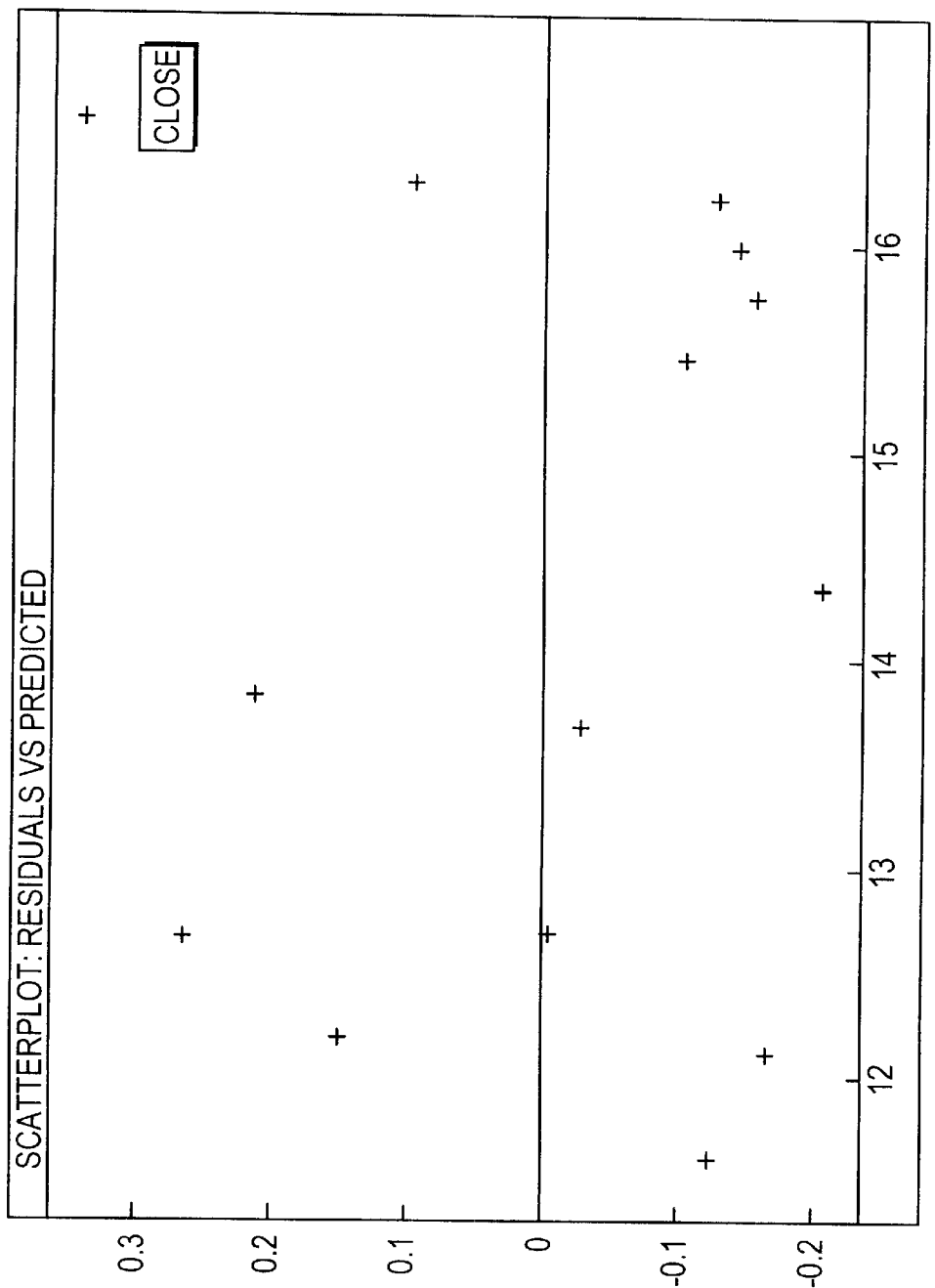
FIG. 13 is an illustration of a scatterplot computed from the validation data sub-set and plotted.

Selecting the Calib Corr Plot button 263 (or valid Corr Plot 264) causes the system to plot the correlation coefficient between the constituent values and the calibration/validation data, transformed according to the specifications in the Transform Control section 242. FIG. 12 shows an exemplary plot using wheat test data of FIG. 15 transformed to a first derivative.

Figure 10:
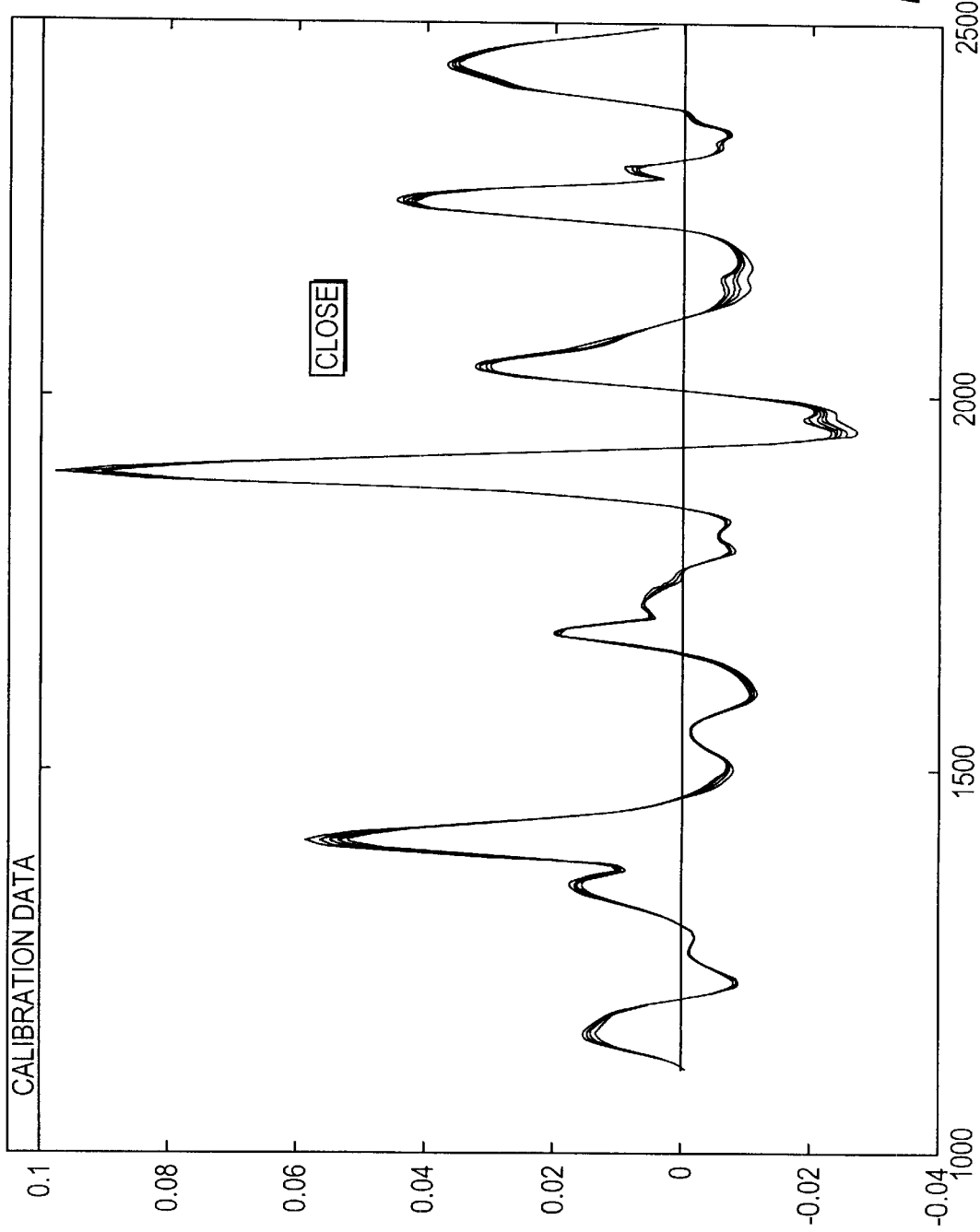
FIG. 10 is an illustration of a plot of the wheat calibration data.

As with the plots of FIGS. 8 and 9, clicking on the "Close" button on FIGS. 9–11 returns operation to the Plot Control window.

The Scatterplots section 246 of FIG. 6 includes a calibration button 265, a validation button 266, an x-variable box 267, and a y-variable box 268. The x-variable and y-variable boxes indicate the variable to be plotted along the corresponding axis. In each box (266, 267), the user may select one of the following values: Actual, Predicted, Residual, Scores, Mahal Dist, or Seq. No. Selection of the calibration button 265 or the validation button 266 causes the corresponding data set to be scatterplotted with the x and y variables contained in the boxes 267 and 268. The plots are made on a sample-by-sample basis. In other words, for each sample, the value of the variable indicated in the "X-axis" window is plotted against the value of the variable indicated in the "Y-axis" window. If the mouse button is pressed while the cursor is within the boundaries of the plot area, the sample ID corresponding to the plotted data closest to the cursor is displayed. In addition to the scatterplot of validation (or calibration) data, two lines are plotted encompassing the data. These lines are constructed at +/-2 times the SEE of the calibration model from the 45-degree line (which itself is not shown) representing perfect matching of the predicted and actual values.

In the context of the x and y variable boxes, the "Actual" value is the value of the constituent indicated in the Constituent window of the Plot Control window; the Predicted value is the value of the constituent as calculated by the current modeling equation, using the data as transformed according to the specifications in the Transform Control section of the window, and the model as specified by the algorithm section; and the residual value is the difference between the Actual and Predicted values as described above.

The Mahalanobis value refers to the distance of the sample, based on the data as subjected to the transform specified in the Transform Control section of the window. The Seq. No. refers to the order in which the samples are present in the data; usually the order in which they were measured. Finally, the scores value is dependent on the algorithm used to create the model in use. If the algorithm is PLS or PCR, then the scores corresponding to the factor number indicated in the "# of factors" window are used for the corresponding axis. If the algorithm is MLR then the data, transformed according to the specifications in the Transform Control section of the window are used for the corresponding axis, with the wavelength chosen being the one indicated in the "# of Factors" window.

Prediction Mode

Referring again to FIG. 1, selecting the Prediction function from the select operation menu 102 allows the user to apply a modeling equation to a set of spectroscopic data in order to calculate the analytical values for the constituents (i.e. target substance of the sample which generated the spectroscopic data) corresponding to the modeling equation. When Predict is selected from the Data Type Selection window 99, most of the menu 99 is inactive, with only the various input data formats 100 are available for selection. After a valid data format is selected, and the select button 112 actuated, the user is prompted, via three file-selection screens, to select a data file, a modeling equation file, and a results file.

The data in the data file is subjected to the same data transformations as the data which gave rise to the modeling equations in the modeling equation file.

Figure 14:
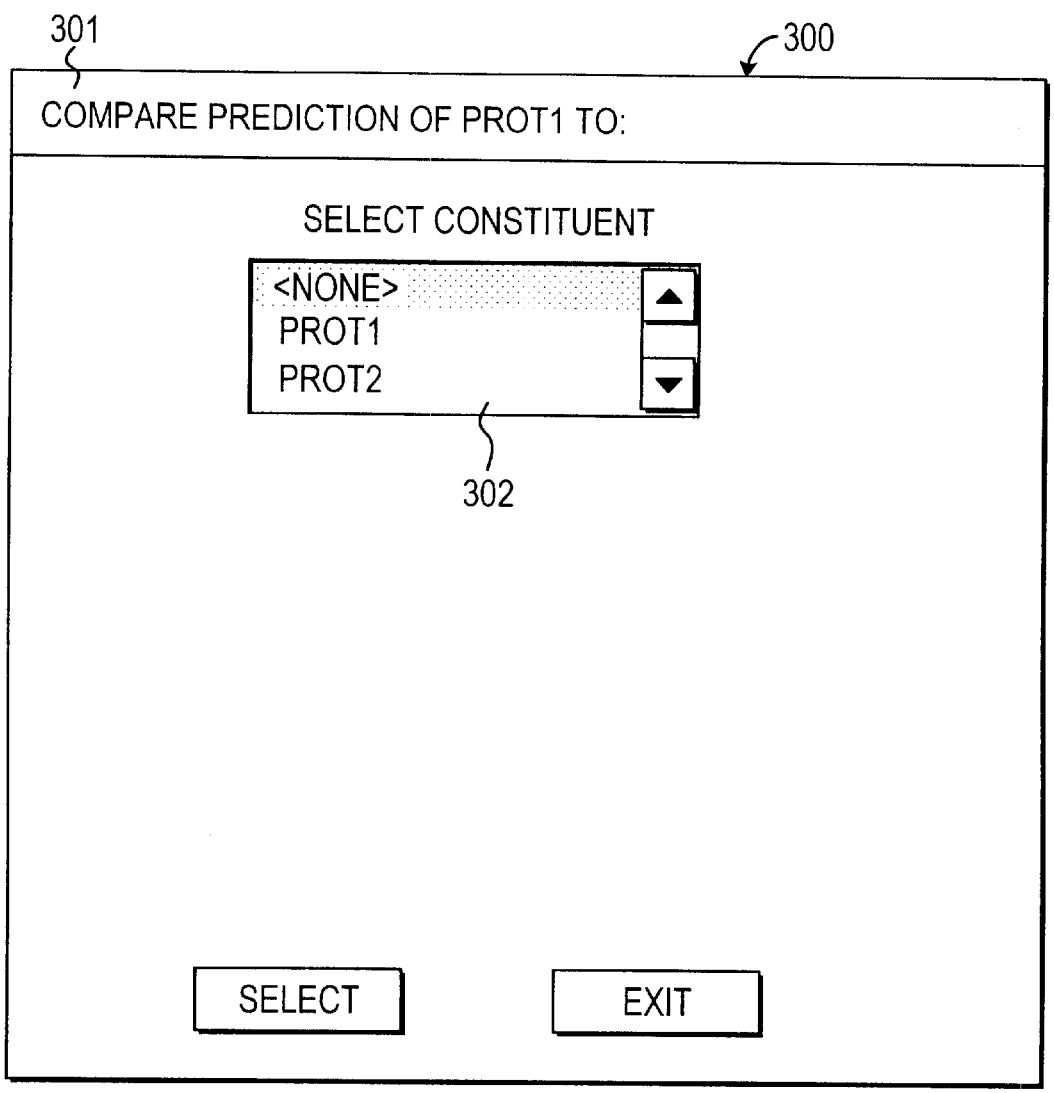
FIG. 14 is an illustration of the prediction window in accordance with the preferred embodiment of the invention.

After all files names are selected, the system displays a constituent selection window 300 (FIG. 14), which prompts the user to specify which constituent in the data file is to be compared to each of the constituents predicted by the modeling equation. In this regard, the screen shown in FIG. 14, is presented multiple times: once for each modeling equation in the modeling equation file.

The header line 301 identifies which constituent from the modeling equation file is being matched, and the entries in the select constituent box 302 are the selections from the data file to compare the predicted value to. If the selection <none> is chosen, then the predicted value is written to the result file without a comparison value from the data file, and without residuals, or any other calculated statistics.

In this regard, in order to predict the amount of the target substance (i.e. constituent) in a future sample (for which the constituent value is not known), the user simply selects "none" in the constituent box 302, and the system returns the predicted value for the amount of the constituent in the same.

What is claimed is:

1. An automated method for modeling spectral data, the spectral data generated by one of diffuse reflectance, clear transmission, or diffuse transmission, comprising the steps of accessing a set of spectral data, the set of spectral data including, corresponding spectral data for each of a plurality of samples, the spectral data for each of the plurality of samples having associated therewith at least one constituent value, the at least one constituent value being a reference value for a target substance in the sample which is measured by a independent measurement technique;

dividing the set of spectral data, with its associated constituent values, into a calibration sub-set and a validation sub-set;

applying a plurality of data transforms to the calibration subset and the validation subset to generate, for each sample, a set of transformed and untransformed calibration data;

applying one or more of a partial least squares, a principal component regression, a neural net, or a multiple linear regression analysis on the transformed and untransformed calibration data sub-sets to obtain corresponding modeling equations for predicting the amount of the target substance in a sample;

identifying a best modeling equation as a function of the correlation between the spectral data in the validation sub-set and the corresponding constituent values in the validation sub-set.

2. The method of claim 1, wherein the data transforms include at least a second derivative and a baseline correction.

3. The method of claim 2, wherein the baseline correction is provided by a normalization transform.

4. The method of claim 1, wherein the data transforms include a second derivative, normalization, a multiplicative scatter correction and a smoothing transform.

5. The method of claim 1, wherein the data transforms include a multiplicative scatter correction and a smoothing transform.

6. The method of claim 2, wherein the second derivative includes a spacing parameter.

7. The method of claim 6, wherein the spacing parameter is a variable.

8. The method of claim 1, wherein the data transforms include performing:

(a) a normalization of the spectral data; and (b) a smoothing transform, a Savitsky-Golay first derivative, or a Savitsky-Golay second derivative of the spectral data.

9. The method of claim 1, wherein the data transforms include performing:

(a) a first derivative of the spectral data; and (b) a normalization, a multiplicative scatter correction, or a smoothing transform on the spectral data.

10. The method of claim 1, wherein the data transforms include two or more of performing a baseline correction, performing a normalization of the spectral data, performing a first derivative on the spectral data, performing a second derivative on the spectral data, performing a multiplicative scatter correction on the spectral data, performing smoothing transform on the spectral data, performing a Kubelka-Munk function on the spectral data, performing a ratio on the spectral data, performing a Savitsky-Golay first derivative, performing a Savitsky-Golay second derivative, performing a mean-centering, and performing a conversion from reflectance/transmittance to absorbance.

11. The method of claim 10, wherein the data transforms are applied singularly and two-at-a-time.

12. The method of claim 2, wherein the baseline correction is combined with each of the normalization, the Kubelka-Munk function, the smoothing transform or conversion from reflectance/transmittance to absorbance; the normalization is combined with each of the baseline correction, conversion from reflectance/transmittance to absorbance, first derivative, second derivative, Kubelka-Munk function, smoothing transform, Savitsky-Golay first derivative, or Savitsky-Golay second derivative; the first derivative transform is combined with each of the baseline correction, normalization, smoothing transform, multiplicative scatter correction, Kubelka-Munk function, or conversion from reflectance/transmittance to absorbance; the second derivative transform is combined with each of the baseline correction, normalization, smoothing transform, the multiplicative scatter correction, or the Kubelka-Munk function; the multiplicative scatter correction is combined with each of the Kubelka-Munk function, smoothing transform and conversion from reflectance/transmittance to absorbance; the Kubelka-Munk function is combined with each of multiplicative scatter correction and smoothing transform; the smoothing transform is combined with each of the baseline correction, conversion from reflectance/transmittance to absorbance, normalization, first derivative, second derivative, multiplicative scatter correction, and Kubelka-Munk function; the Savitsky-Golay first derivative is combined with each of the baseline correction, normalization, multiplicative scatter correction, the Kubelka-Munk function, the smoothing transform, and conversion from reflectance/transmittance to absorbance; the Savitsky-Golay second derivative is combined with each of the baseline correction, normalization transform, the multiplicative scatter correction, the Kubelka-Munk function, smoothing transform, and conversion from reflectance/transmittance to absorbance; and the conversion from reflectance/transmittance to absorbance is combined with each of the baseline correction, normalization, the multiplicative scatter correction, and smoothing transform.

13. The method of claim 1, wherein the data transform is a ratio comprising a denominator and a numerator and said numerator comprises a baseline correction, normalization, multiplicative scatter correction, smoothing transform, or Kubelka-Munk function, when the denominator comprises baseline correction; the numerator comprises normalization when the denominator comprises normalization; the numerator comprises first derivative when the denominator comprises first derivative, the numerator comprises second derivative when the denominator comprises second derivative; the numerator comprises multiplicative scatter correction when the denominator comprises multiplicative scatter correction; the numerator comprises Kubelka-Munk function when the denominator comprises Kubelka-Munk function; the numerator comprises smoothing transform when the denominator comprises smoothing transform; the numerator comprises Savitsky-Golay first derivative when the denominator comprises Savitsky-Golay first derivative; the numerator comprises Savitsky-Golay second derivative when the denominator comprises Savitsky-Golay second derivative.

14. The method of claim 1, wherein the identifying step includes identifying a best mode equation as a function of the standard error of estimate SEP of the validation data.

15. The method of claim 1, wherein the identifying step includes identifying a best mode equation as a function of standard error of estimate SEE of the calibration data and the Standard Error of Estimate SEP of the validation data.

16. The method of claim 1, wherein the identifying step includes a best mode equation as a function of a weighted average of standard error of estimate SEE of the calibration data and the Standard Error of Estimate SEP of the validation data.

17. The method of claim 1, wherein the identifying step includes calculating a figure of merit (FOM) for each modeling equation, the FOM being defined as:

$$FOM = \sqrt{(SEE^2 + 2 \cdot SEP^2)/3}$$

where:

SEE is the Standard Error of Estimate from the calculations on the calibration data;

SEP is the Standard Error of Estimate from the calculations on the validation data;

and the modeling equation which provides the best correlation between the spectral data in the validation sub-set and the corresponding constituent values in the validation sub-set being identified as the modeling equation with the lowest FOM value.

18. The method of claim 1, wherein the identifying step includes calculating a figure of merit (FOM) for each modeling equation, the FOM being defined as:

$$FOM=\sqrt{(SEE^{2}+2*SEP^{2}+W*b^{2})/(3+W)}$$

where:
SEE is the Standard Error of Estimate from the calculations on the calibration data;
SEP is the Standard Error of Estimate from the calculations on the validation data;
b is the bias of the validation data;
W is the weighting factor for the bias; and
the modeling equation which provides the best correlation between the spectral data in the validation sub-set and the corresponding constituent values in the validation sub-set being identified as the modeling equation with the lowest FOM value.

19. A method for generating a modeling equation is provided comprising the steps of
(a) operating an instrument so as to generate and store a spectral data set of diffuse reflectance, clear transmission, or diffuse transmission spectrum data points over a selected wavelength range, the spectral data set including spectral data for a plurality of samples;
(b) generating and storing a constituent value for each of the plurality of samples, the constituent value being indicative of an amount of a target substance in its corresponding sample;
(c) dividing the spectral data set into a calibration subset and a validation subset;
(d) transforming the spectral data in the calibration subset and the validation subset by applying a plurality of a first mathematical functions to the calibration subset and the validation subset to obtain a plurality of transformed validation data subsets and a plurality of transformed calibration data subsets;
(e) resolving each transformed calibration data subset in step (d) by at least one of a second mathematical function to generate a plurality of modeling equations; and
(f) identifying the modeling equation which provides the best correlation between the spectral data in the validation subset and the corresponding constituent values in the validation subset.

20. The method of claim 19, wherein the identifying step includes identifying a best mode equation as a function of the standard error of estimate SEP of the validation data.

21. The method of claim 19, wherein the identifying step includes identifying a best mode equation as a function of standard error of estimate SEE of the calibration data and the standard error of estimate SEP of the validation data.

22. The method of claim 19, wherein the identifying step includes a best mode equation as a function of a weighted average of standard error of estimate SEE of the calibration data and the standard error of estimate SEP of the validation data.

23. The method of claim 19, wherein the identifying step includes calculating a figure of merit (FOM) for each modeling equation, the FOM being defined as:

$$FOM=\sqrt{(SEE^{2}+2*SEP^{2})/3}$$

where:
SEE is the Standard Error of Estimate from the calculations on the calibration data;
SEP is the Standard Error of Estimate from the calculations on the validation data;
and the modeling equation which provides the best correlation between the spectral data in the validation sub-set and the corresponding constituent values in the validation sub-set being identified as the modeling equation with the lowest FOM value.

24. The method of claim 19, wherein the identifying step includes calculating a figure of merit (FOM) for each modeling equation, the FOM being defined as:

$$FOM=\sqrt{(SEE^{2}+2*SEP^{2}+W*b^{2})/(3+W)}$$

where:
SEE is the Standard Error of Estimate from the calculations on the calibration data;
SEP is the Standard Error of Estimate from the calculations on the validation data;
b is the bias of the validation data;
W is the weighting factor for the bias; and
the modeling equation which provides the best correlation between the spectral data in the validation sub-set and the corresponding constituent values in the validation sub-set being identified as the modeling equation with the lowest FOM value.

25. The method of claim 19, wherein the instrument is a spectrophotometer, a spectral detector receptive of spectra from the spectrophotometer, a data station receptive of transmittance spectra from the detector.

26. The method of claim 19, wherein the set of spectral data comprises one of a set of natural product spectroscopic data, process development spectroscopic data, and a raw material spectroscopic data.

27. The method of claim 19, wherein step (e) comprises resolving each transformed calibration data sub-set in step (d) by a partial least squares, a principal component regression, and a multiple linear regression analysis to generate a plurality of modeling equations.

28. The method of claim 19, wherein the at least one second mathematical function includes one or more of a partial least squares, a principal component regression, a neural network, and a multiple linear regression analysis.

29. The method of claim 19, wherein the first set of mathematical functions include performing a normalization of the spectral data, performing a first derivative on the spectral data, performing a second derivative on the spectral data, performing a multiplicative scatter correction on the spectral data, performing smoothing transform on the spectral data, converting conversion from reflectance/transmittance to absorbance, performing a Kubelka-Munk function on the spectral data, performing a Savitsky-Golay first derivative, and performing a Savitsky-Golay second derivative.

30. The method of claim 29, wherein the first set of mathematical functions are applied singularly and two-at-a-time.

31. The method of claim 19, wherein the normalization transform is combined with each of the first derivative, second derivative, and smoothing transforms; the first derivative transform is combined with the normalization, and smoothing transforms; the second derivative transform is combined with the normalization and smoothing transforms; the multiplicative scatter correction transform is combined with first derivative, second derivative, Kubelka-Munk, and smoothing transforms; the Kubelka-Munk transform is combined with the normalization, first derivative, second derivative, multiplicative scatter correction, and smoothing transforms; the smoothing transform is combined with the a, normalization, first derivative, second derivative, multiplicative scatter correction, and Kubelka-Munk transforms; and the conversion from reflectance/transmittance to absorbance is combined with is combined with the normalization, first derivative, second derivative, multiplicative scatter correction, and smoothing transforms.

32. A computer executable process, operative to control a computer, stored on a computer readable medium, for determining analyzing a set of data on a computer readable medium, the set of data including, for each of a plurality of samples, corresponding spectral data and a corresponding constituent value, the process comprising the steps of:

dividing the spectral data into a calibration sub-set of spectral data and a validation sub-set of spectral data;

applying a plurality of data transforms to the spectral data in the validation sub-set and the calibration sub-set;

applying one or more of a partial least squares, a principal component regression, a neural net, or a multiple linear regression analysis on the transformed and untransformed data sets of the spectral data in the calibration sub-set to obtain a plurality of modeling equations;

applying the spectral data in the validation sub-set to each of the plurality of modeling equations to obtain corresponding values;

and processing the values in order to select a best modeling equation for analyzing the spectral data.

33. The process of claim 32, wherein the data transforms include at least a second derivative and a baseline correction.

34. The process of claim 32, wherein the data transforms include a second derivative, a normalization, a multiplicative scatter correction and a smoothing transform.

35. The process of claim 32, wherein the data transforms include a multiplicative scatter correction and a smoothing transform.

36. The process of claims 33, wherein the second derivative includes a spacing parameter.

37. The process of claim 36, wherein the spacing parameter is a variable.

38. The process of claim 32, wherein the data transforms include performing:

(a) a normalization of the spectral data, a smoothing transform; and (b) a Savitsky-Golay first derivative, or a Savitsky-Golay second derivative of the spectral data.

39. The process of claim 32, wherein the data transforms include performing a first derivative of the spectral data, and a normalization, a multiplicative scatter correction, or a smoothing transform on the spectral data.

40. The process of claim 32, wherein the processing step includes identifying a best modeling equation as a function of the standard error of estimate SEP of the validation data.

41. The process of claim 32, wherein the processing step includes identifying a best modeling equation as a function of standard error of estimate SEE of the calibration data and the standard error of estimate SEP of the validation data.

42. The process of claim 32, wherein the processing step includes a best modeling equation as a function of a weighted average of standard error of estimate SEE of the calibration data and the standard error of estimate SEP of the validation data.

43. The process of claim 32, wherein the processing the values step comprises calculating a figure of merit (FOM) for each modeling equation, the FOM being defined as:

$$FOM = \sqrt{(SEE^{2} + 2 \cdot SEP^{2})/3}$$

where:

SEE is the Standard Error of Estimate from the calculations on the calibration data;

SEP is the Standard Error of Estimate from the calculations on the validation data;

and the modeling equation which provides the best correlation between the spectral data in the validation sub-set and the corresponding constituent values in the validation sub-set being identified as the modeling equation with the lowest FOM value.

44. The process of claim 32, wherein the processing the values step comprises calculating a figure of merit (FOM) for each modeling equation, the FOM being defined as:

$$FOM = \sqrt{(SEE^{2} + 2 \cdot SEP^{2} + W \cdot b^{2})/(3+W)}$$

where:

SEE is the Standard Error of Estimate from the calculations on the calibration data;

SEP is the Standard Error of Estimate from the calculations on the validation data;

b is the bias of the validation data;

W is the weighting factor for the bias; and the modeling equation which provides the best correlation between the spectral data in the validation sub-set and the corresponding constituent values in the validation sub-set being identified as the modeling equation with the lowest FOM value.

45. The process of claim 32, wherein the data transforms include performing a conversion from reflectance/transmittance to absorbance, a normalization, a multiplicative scatter correction, and a smoothing transform on the spectral data.

46. The process of claim 32, wherein the data transforms include performing a baseline correction, a normalization, a first derivative, performing a second derivative, a multiplicative scatter correction, a smoothing transform, a conversion from reflectance/transmittance to absorbance, a Kubelka-Munk function, a ratio, a Savitsky-Golay first derivative, a Savitsky-Golay second derivative, a mean-centering, and a conversion from reflectance/transmittance to absorbance on the spectral data.

47. The process of claim 32, wherein the data transforms are applied singularly and two-at-a-time.

48. The method of claim 32, wherein the normalization transform is combined with each of the first derivative, second derivative, and smoothing transforms; the first derivative transform is combined with the normalization, and smoothing transforms; the second derivative transform is combined with the normalization and smoothing transforms; the multiplicative scatter correction transform is combined with conversion from reflectance/transmittance to absorbance, first derivative, second derivative, Kubelka-Munk function, and smoothing transform; the Kubelka-Munk function is combined with the normalization, first derivative, second derivative, multiplicative scatter correction, and smoothing transforms; the smoothing transform is combined with the conversion from reflectance/transmittance to absorbance, normalization, first derivative, second derivative, multiplicative scatter correction, and Kubelka-Munk transforms; and the conversion from reflectance/transmittance to absorbance is combined with the normalization, first derivative, second derivative, multiplicative scatter correction, and smoothing transforms.

49. An automated method for modeling spectral data, the spectral data generated by one of diffuse reflectance, clear transmission, or diffuse transmission, comprising the steps of
- accessing a set of spectral data, the set of spectral data including, corresponding spectral data for each of a plurality of samples, the spectral data for each of the plurality of samples having associated therewith at least one constituent value, the at least one constituent value being a reference value for a target substance in the sample which is measured by a independent measurement technique;
- applying a plurality of data transforms to the set of spectral data to generate, for each sample, a set of transformed and untransformed calibration data;
- dividing the set of spectral data, with its associated constituent values, into a calibration sub-set and a validation sub-set;
- applying one or more of a partial least squares, a principal component regression, a neural net, or a multiple linear regression analysis on the transformed and untransformed calibration data sub-sets to obtain corresponding modeling equations for predicting the amount of the target substance in a sample;
- identifying a best modeling equation as a function of the correlation between the spectral data in the validation sub-set and the corresponding constituent values in the validation sub-set.

50. The method of claim 49, wherein the data transforms include at least a second derivative and a baseline correction.

51. The method of claim 50, wherein the baseline correction is provided by a normalization transform.

52. The method of claim 49, wherein the data transforms include a second derivative, a normalization, a multiplicative scatter correction and a smoothing transform.

53. The method of claim 49, wherein the data transforms include a multiplicative scatter correction and a smoothing transform.

54. The method of claim 50, wherein the second derivative includes a spacing parameter.

55. The method of claim 54, wherein the spacing parameter is a variable.

56. The method of claim 49, wherein the data transforms include performing:
- (a) a normalization of the spectral data; and
- (b) a smoothing transform, a Savitsky-Golay first derivative, or a Savitsky-Golay second derivative of the spectral data.

57. The method of claim 49, wherein the data transforms include performing:
- (a) a first derivative of the spectral data; and
- (b) a normalization, a multiplicative scatter correction, or a smoothing transform on the spectral data.

58. The method of claim 49, wherein the data transforms include two or more of performing a baseline correction, performing a normalization of the spectral data, performing a first derivative on the spectral data, performing a second derivative on the spectral data, performing a multiplicative scatter correction on the spectral data, performing smoothing transform on the spectral data, performing a Kubelka-Munk function on the spectral data, performing a ratio on the spectral data, performing a Savitsky-Golay first derivative, performing a Savitsky-Golay second derivative, performing a mean-centering, and performing a conversion from reflectance/transmittance to absorbance.

59. The method of claim 58, wherein the data transforms are applied singularly and two-at-a-time.

60. The method of claim 50, wherein the baseline correction is combined with each of the normalization, the Kubelka-Munk function, the smoothing transform or conversion from reflectance/transmittance to absorbance; the normalization is combined with each of the baseline correction, conversion from reflectance/transmittance to absorbance, first derivative, second derivative, Kubelka-Munk function, smoothing transform, Savitsky-Golay first derivative, or Savitsky-Golay second derivative; the first derivative transform is combined with each of the baseline correction, normalization, smoothing transform, multiplicative scatter correction, Kubelka-Munk function, or conversion from reflectance/transmittance to absorbance; the second derivative transform is combined with each of the baseline correction, normalization, smoothing transform, the multiplicative scatter correction, or the Kubelka-Munk function; the multiplicative scatter correction is combined with each of the Kubelka-Munk function, smoothing transform and conversion from reflectance/transmittance to absorbance; the Kubelka-Munk function is combined with each of multiplicative scatter correction and smoothing transform; the smoothing transform is combined with each of the baseline correction, conversion from reflectance/transmittance to absorbance, normalization, first derivative, second derivative, multiplicative scatter correction, and Kubelka-Munk function; the Savitsky-Golay first derivative is combined with each of the baseline correction, normalization, multiplicative scatter correction, the Kubelka-Munk function, the smoothing transform, and conversion from reflectance/transmittance to absorbance; the Savitsky-Golay second derivative is combined with each of the baseline correction, normalization transform, the multiplicative scatter correction, the Kubelka-Munk function, smoothing transform, and conversion from reflectance/transmittance to absorbance; and the conversion from reflectance/transmittance to absorbance is combined with each of the baseline correction, normalization, the multiplicative scatter correction, and smoothing transform.

61. The method of claim 49, wherein the data transform is a ratio comprising a denominator and a numerator and said numerator comprises a baseline correction, normalization, multiplicative scatter correction, smoothing transform, or Kubelka-Munk function, when the denominator comprises baseline correction; the numerator comprises normalization when the denominator comprises normalization; the numerator comprises first derivative when the denominator comprises first derivative, the numerator comprises second derivative when the denominator comprises second derivative; the numerator comprises multiplicative scatter correction when the denominator comprises multiplicative scatter correction; the numerator comprises Kubelka-Munk function when the denominator comprises Kubelka-Munk function; the numerator comprises smoothing transform when the denominator comprises smoothing transform; the numerator comprises Savitsky-Golay first derivative when the denominator comprises Savitsky-Golay first derivative; the numerator comprises Savitsky-Golay second derivative when the denominator comprises Savitsky-Golay second derivative.

62. The method of claim 49, wherein the identifying step includes identifying a best mode equation as a function of the standard error of estimate SEP of the validation data.

63. The method of claim 49, wherein the identifying step includes identifying a best mode equation as a function of standard error of estimate SEE of the calibration data and the Standard Error of Estimate SEP of the validation data.

64. The method of claim 49, wherein the identifying step includes a best mode equation as a function of a weighted average of standard error of estimate SEE of the calibration data and the Standard Error of Estimate SEP of the validation data.

65. The method of claim 49, wherein the identifying step includes calculating a figure of merit (FOM) for each modeling equation, the FOM being defined as:

$$FOM = \sqrt{(SEE^{2} + 2 \ast SEP^{2})/3}$$

where:
SEE is the Standard Error of Estimate from the calculations on the calibration data;
SEP is the Standard Error of Estimate from the calculations on the validation data;
and the modeling equation which provides the best correlation between the spectral data in the validation sub-set and the corresponding constituent values in the validation sub-set being identified as the modeling equation with the lowest FOM value.

66. The method of claim 49, wherein the identifying step includes calculating a figure of merit (FOM) for each modeling equation, the FOM being defined as:

$$FOM = \sqrt{(SEE^{2} + 2 \ast SEP^{2} + W \ast b^{2})/(3+w)}$$

where:
SEE is the Standard Error of Estimate from the calculations on the calibration data;
SEP is the Standard Error of Estimate from the calculations on the validation data;
b is the bias of the validation data;
W is the weighting factor for the bias; and
the modeling equation which provides the best correlation between the spectral data in the validation sub-set and the corresponding constituent values in the validation sub-set being identified as the modeling equation with the lowest FOM value.

67. The method of claim 1, wherein the data comprises samples generated by biological processes including blood samples used in predicting clinical chemistry parameters such as blood glucose levels.

* * * * *